(12) United States Patent
Chen et al.

(10) Patent No.: US 8,243,473 B2
(45) Date of Patent: *Aug. 14, 2012

(54) SWITCHING POWER SUPPLY DEVICE AND SWITCHING POWER SUPPLY CONTROL CIRCUIT

(75) Inventors: Jian Chen, Matsumoto (JP); Koji Sonobe, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 361 days.

This patent is subject to a terminal disclaimer.

(21) Appl. No.: 12/605,637

(22) Filed: Oct. 26, 2009

(65) Prior Publication Data

US 2010/0172157 A1 Jul. 8, 2010

(30) Foreign Application Priority Data

Oct. 24, 2008 (JP) ................................ 2008-274171
Jun. 29, 2009 (JP) ................................ 2009-153140

(51) Int. Cl.
*H02M 3/335* (2006.01)

(52) U.S. Cl. .............................. 363/16; 363/17; 363/127

(58) Field of Classification Search ..................... 363/16, 363/17, 89, 97, 98, 127, 131, 132
See application file for complete search history.

(56) References Cited

U.S. PATENT DOCUMENTS

| | | | |
|---|---|---|---|
| 6,301,128 B1 | 10/2001 | Jang et al. | |
| 6,466,462 B2 * | 10/2002 | Nishiyama et al. | 363/21.11 |
| 6,807,073 B1 * | 10/2004 | Scarlatescu | 363/34 |
| 6,975,098 B2 * | 12/2005 | Vinciarelli | 323/266 |
| 7,072,162 B2 * | 7/2006 | D'Amato | 361/91.7 |
| 7,158,392 B2 * | 1/2007 | Hosokawa et al. | 363/21.06 |
| 7,184,280 B2 * | 2/2007 | Sun et al. | 363/21.02 |
| 7,796,404 B2 | 9/2010 | Reddy | |
| 2005/0122753 A1 | 6/2005 | Soldano | |
| 2008/0055942 A1 | 3/2008 | Tao et al. | |

FOREIGN PATENT DOCUMENTS

| | | |
|---|---|---|
| JP | 2002-369516 A | 12/2002 |
| JP | 2005-198375 A | 7/2005 |
| JP | 2005-198438 A | 7/2005 |

OTHER PUBLICATIONS

Champion Brochure of "CM6900G", Resonant Controller, Champion Microelectric Corporation, Nov. 22, 2007, pp. 1-12.

* cited by examiner

*Primary Examiner* — Rajnikant Patel
(74) *Attorney, Agent, or Firm* — Rossi, Kimms & McDowell LLP

(57) ABSTRACT

The invention provides a switching power supply device which can detect a light load state on a pulse-by-pulse basis without worsening power efficiency. In a synchronous control circuit, for each timing of the turning-on of main switching elements, the delay time Tdif of the conduction timing of internal diodes Ds determined according to the magnitude of the load LD is detected by a comparator, a reference time pulse Tsrs having a prescribed time width is generated by a load judgment circuit, and the logical product of the two is generated by an AND circuit. By this means, the load is regarded as being a light load when the delay time Tdif is longer than the reference time pulse Tsrs, and the synchronous rectification MOSFETs Qs are not turned on.

13 Claims, 16 Drawing Sheets

FIG. 9

Operating mode classification

|  | Heavy Load (HL) | Light Load (LL) | Very Light Load (VLL) |
|---|---|---|---|
| fop<fr1 | Mode 1 | Mode 2 | Mode 3 |
| fop≧fr1 | Mode 4 | Mode 5 | Mode 6 | fop: Operating frequency
fr1: Resonance frequency

Mode 4 = Secondary Side current waveforms

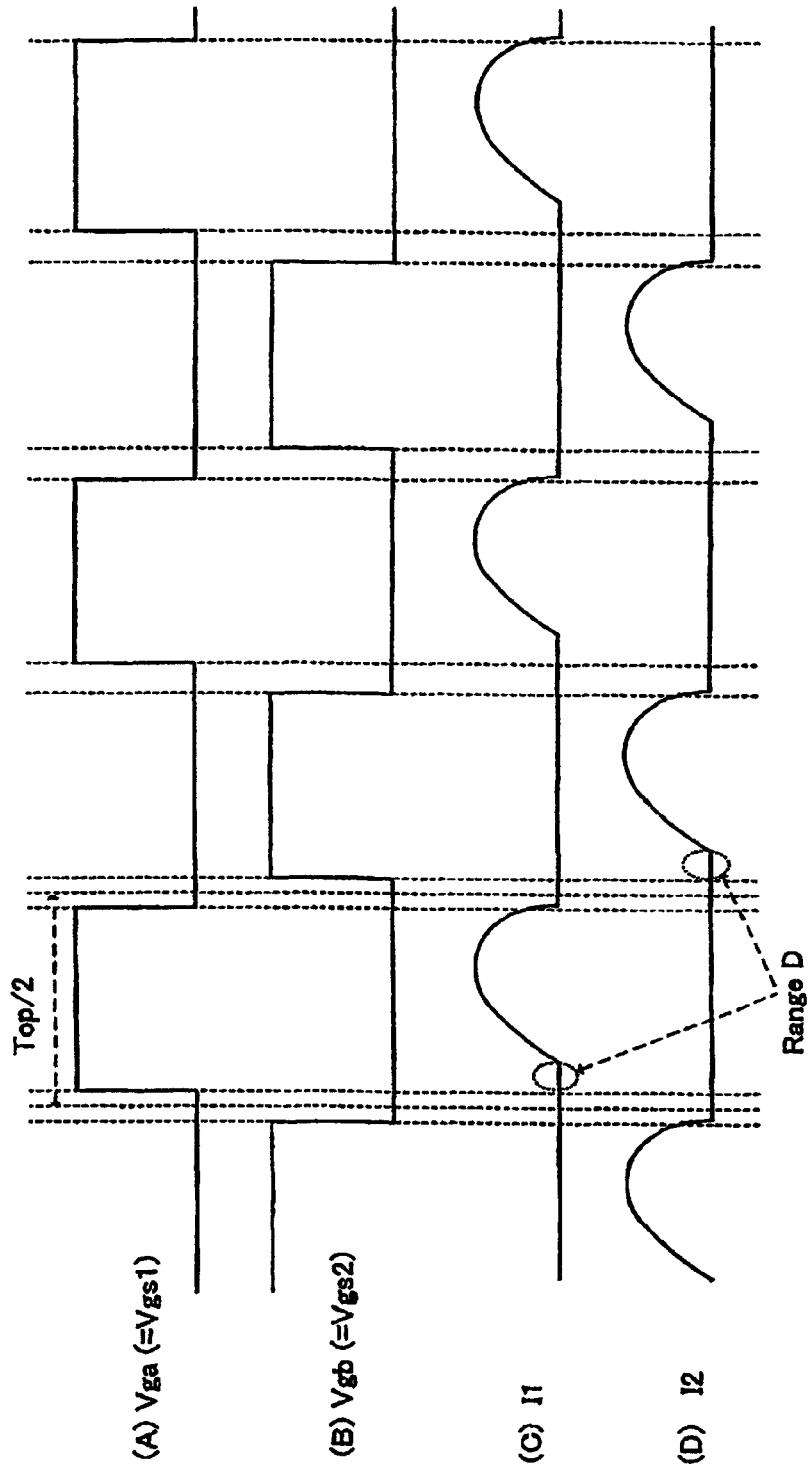

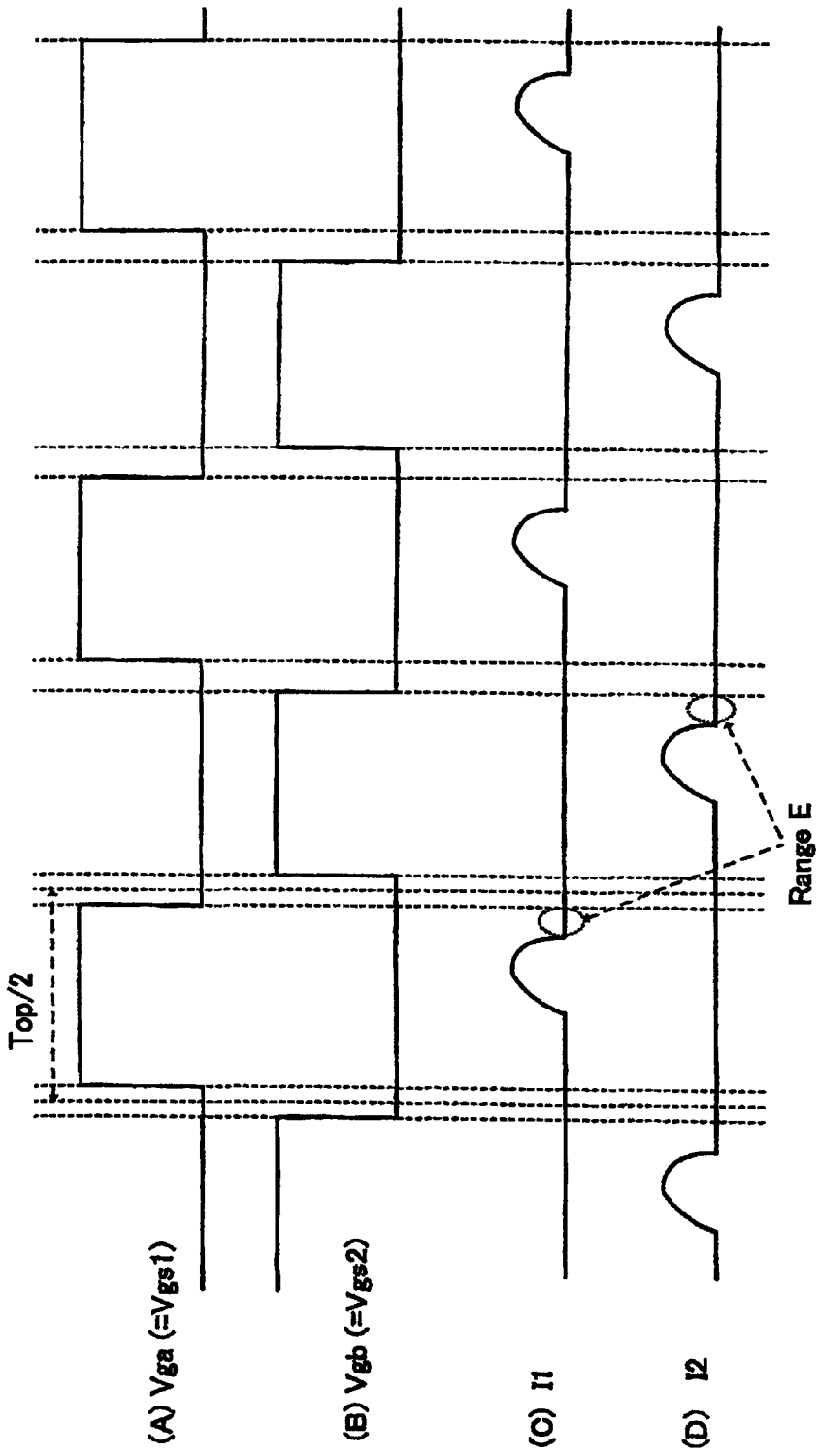

(B) OPERATING WAVEFORMS OF DIFFERENT PORTIONS (A) SYNCHRONOUS RECTIFICATION MOSFET CONTROL CIRCUIT

SWITCHING POWER SUPPLY DEVICE AND SWITCHING POWER SUPPLY CONTROL CIRCUIT

BACKGROUND OF THE INVENTION

The invention relates to a switching power supply device and switching power supply control circuit comprising a series resonance circuit having a current resonance inductor and a current resonance capacitor, and in particular relates to a switching power supply device and switching power supply control circuit which eliminated backflow of current under light loading.

Switching power supply devices comprising current resonance-type converters such as that shown in FIG. 7 are known as switching power supply devices of the prior art. In such current resonance converters, an input DC voltage Vi is applied to a series resonance circuit having a resonance inductor Lr and a resonance capacitor Cr, and two main switching elements Qa, Qb, comprising MOSFETs (Metal-Oxide-Semiconductor Field-Effect Transistors) or similar, are turned on and off to control the path of the primary-side current flowing in the primary windings L1 of a power conversion transformer T, so that a sinusoidal current flows in the primary windings L1 of the transformer T. The secondary windings L2 and tertiary windings L3 of the transformer T (where the windings ratio L1:L2:L3 is taken to be n:1:1) are connected to rectifying diodes D1, D2 which rectify the respectively induced secondary currents I1, I2, and to an output capacitor $C_O$ which smoothes the output voltage $V_O$ to the load LD. Further, the output voltage $V_O$ to the load LD is fed back to a driving circuit 3 to turn on and off the main switching elements Qa, Qb via an error amplifier 1 and a VCO (Voltage Controlled Oscillator) 2, and the current flowing in the primary windings L1 of the transformer T and the voltage are controlled to control the output voltage $V_O$ at a constant voltage. The VCO 2 functions such that, from the output of the error amplifier 1, when the output voltage $V_O$ is judged to be higher than a preset voltage or the loading is light, the output frequency is raised, and when the output voltage $V_O$ is judged to be lower than a preset voltage or the loading is heavy, the output frequency is lowered.

However, when using such a switching power supply device as a low-voltage, large-current power supply, when secondary currents I1 and I2 flow in the rectifying diodes D1 and D2 provided on the secondary side of the transformer T, large current losses $V_F \times I_O$ due to the forward-direction voltage drop $V_F$ across the rectifying diodes D1, D2 occur. This current $I_O$ represents the current values of either of the secondary currents I1, I2.

Hence a separate-excitation driving type current resonance circuit is used, in which MOSFETs Qs1, Qs2 with low on-state resistances are connected as switching elements for synchronous rectification as shown in FIG. 8 in place of these rectifying diodes D1, D2 to perform synchronous rectification, to reduce such power losses. The MOSFETs Qs1, Qs2 in FIG. 8 are controlled by the driving circuit 3 to be turned on and off synchronously with the operating frequency fop at which the primary-side main switching elements Qa, Qb are turned on and off, and the secondary currents I1, I2 are stored in the capacitor $C_O$ in alternation.

Here, separate-excitation synchronous rectification in the current resonance converter of FIG. 8, in which the secondary-side rectifying diodes D1, D2 in FIG. 7 are replaced with MOSFETs Qs1, QS2 with low on-state resistances, is considered.

Synchronous rectification methods include self-excitation driving methods and separate-excitation driving methods. In separate-excitation driving methods, driving signals are output by a logic circuit, and if the logic circuit is incorporated in a power supply IC (Integrated Circuit), synchronous rectification functions can easily be realized by the power supply manufacturer. Hence IC manufacturers have proposed various separate-excitation driving methods (see U.S. Pat. No. 7,184,280, U.S. Patent Application No. 2008/0055942, U.S. Patent Application No. 2005/0122753, Japanese Patent Application Laid-open No. 2005-198438, and Japanese Patent Application Laid-open No. 2005-198375, described below).

Such a switching power supply device of the prior art is configured so as to cause the main switching elements Qa, Qb to perform switching operation, to obtain an arbitrary DC output via the voltage-conversion transformer T. In such a device, charge accumulated on the capacitor $C_O$ is discharged, according to the magnitude and similar of the load LD connected to the secondary side, so that current flowing back to the transformer T (back current) occurs, and the problem of power loss in the backflow region arises.

Simply considering separate-excitation driving synchronous rectification, it is thought to be sufficient that the synchronous driving signals of the MOSFETs Qs1, Qs2 are synchronized with the gate signals controlling switching of the main switching elements Qa, Qb. But in actuality, if backflow regions are not detected in each of the operating modes, and the signals are not converted into driving signals synchronized therewith, charge accumulated on the output capacitor $C_O$ is discharged, a current flowing back to the transformer T (back current) occurs, and efficiency is reduced. Further, there is the concern of circuit destruction due to the backflow of power to the primary side of the transformer T.

In the current resonance converter of FIG. 8, the transformer T of the current resonance converter of FIG. 7 is shown separated into an excited inductance component Lm and an ideal transformer Ti, and the operating principle is presented so as to facilitate understanding. Here, prior to explaining power losses in the above-described backflow region, the principle of operation of a current resonance converter is explained.

For the current resonance converter shown here, two types of basic current resonance frequencies, fr1 and fr2, are defined, as in equations (1) and (2) below. Here Lr, Lm and Cr are respectively the inductance of the resonance inductor Lr, the excitation inductance component of the transformer T, and the capacitance of the resonance capacitor Cr.

$$fr1 = \frac{1}{2\pi\sqrt{Lr \cdot Cr}} \tag{1}$$

$$fr2 = \frac{1}{2\pi\sqrt{(Lr + Lm) \cdot Cr}} \tag{2}$$

In the switching power supply device of FIG. 8, when power is supplied to the load LD the voltage across the excitation inductance component Lm of the transformer T is clamped at $n \times (V_O + V_F)$ according to the output voltage $V_O$, the excitation inductance component Lm does not contribute to current resonance, and through operation at the first resonance frequency fr1 (see equation (1) above) determined by the resonance capacitor Cr and resonance inductor Lr, power is supplied to the secondary-side circuit. In this case, the sum of the current Im flowing in the excitation inductance component Lm and the resonance current Ir flows to the resonance capacitor Cr as a charge/discharge current. At this time, the operation frequency fop of the main switching elements Qa, Qb is controlled by the VCO 2 so as to stabilize the output voltage $V_O$.

The second resonance frequency fr2 (see equation (2) above) is the resonance frequency when power is not supplied to the load LD connected to the secondary side of the transformer T; the ideal transformer Ti does not function as a transformer, and the voltage across the excitation inductance component Lm of the transformer T is not clamped, so that resonance operation occurs mainly due to the capacitance Cr of the resonance capacitor Cr, the resonance inductance Lr of the resonance inductor Lr, and the excitation inductance component Lm.

The specific resonance operation of the current resonance converter can be considered by dividing operation into six operation modes (Mode 1 to Mode 6), as shown in FIG. 9, according to the relation between the operation frequency fop and the first resonance frequency fr1 (hereafter simply called the resonance frequency), and the magnitude of the load LD connected to the secondary side of the transformer T.

That is, in FIG. 9, Mode 1 to Mode 3 are for cases in which the operating frequency fop is lower than the resonance frequency fr1, and Mode 4 to Mode 6 are for cases in which the operating frequency fop is equal to or higher than the resonance frequency fr1. If the magnitude of the connected load LD is greater than 50% of the rated load (maximum load) for the switching power supply device, the state is a heavy load (HL) state; if the load magnitude is 20 to 50%, the state is a light load (LL) state; and if the load is less than 20%, the state is a very light load (VLL) state.

Secondary-side current waveforms induced via the transformer T in each of the operation modes will be explained, using FIG. 10 to FIG. 15. Here, the backflow region in each operation mode is determined by the relation between the operating frequency fop and the resonance frequency fr1 of the current resonance converter, and by the load LD. The operating frequency fop changes with the circuit parameters and the load state, but the resonance frequency fr1 is determined by the magnitudes of the resonance capacitor Cr and the resonance inductor Lr. Hence while synchronous rectification in which the synchronous driving signals Vgs1, Vgs2 are completely synchronized with the power switching signals as shown in FIG. 8 is a simple method, in this case the five backflow regions described below pose problems, and measures to resolve these problems are necessary.

That is, in the first operating mode (Mode 1) shown in FIG. 10 of a switching power supply device which turns two main switching elements Qa, Qb on and off by means of respective gate signals Vga, Vgb to supply secondary currents I1, I2, in the second half of each half-period (Top/2) of switching operation, if the MOSFETs Qs1, Qs2 for synchronous rectification are not reliably turned off, backflow of the secondary currents I1, I2 cannot be impeded. This is because the relation between the operating frequency fop and the resonance frequency fr1 in the first operating mode is fop<fr1, so that even if a half-period of resonance operation (Tr/2) ends, a half-period (Top/2) of switching operation has not yet ended. Hence when the gate signals Vga, Vgb shown in FIGS. 10A and 10B are output without modification as synchronous driving signals Vgs1, Vgs2 to the synchronous rectification MOSFETs Qs1, Qs2 shown in FIG. 8, a backflow current flows in this timing region (range A).

In the case of the second operating mode (Mode 2), in which the operating frequency fop is lower than the resonance frequency fr1, and moreover the load LD is in the light load (LL) state, separately from range A in which backflow occurs in FIG. 10, there is the concern that backflow may occur in range B shown in FIG. 11 as well (the region of the timing immediately after the main switching element Qa or Qb is turned on). This is because in a current resonance converter, when the load LD is somewhat lighter, the timing of the start of resonance operation lags behind the start of switching operation. And, operation is such that when the load LD becomes still lighter, the timing of the start of resonance operation also lags further.

Similarly, in the case of the third operating mode (Mode 3), in which the operating frequency fop is lower than the resonance frequency fr1, and moreover the load LD is in the very light loading (VLL) state with a still-smaller load, backflow occurs in range A and in range B. And, within half of the resonance period Tr shown in FIG. 12, backflow also occurs in range C, equivalent to a range in which resonance has ended.

In the fourth operating mode (Mode 4), shown in FIG. 13, the operating frequency fop is equal to or greater than the resonance frequency fr1, and moreover the load LD is in the heavy loading (HL) state; in this case, the secondary currents I1, I2 are continuous, and so there is no concern of the occurrence of backflow.

In the fifth operating mode (Mode 5), shown in FIG. 14, the operating frequency fop is equal to or greater than the resonance frequency fr1, and moreover the load LD is in the light loading (LL) state; backflow occurs in range D (the region of the timing immediately after a main switching element Qa or Qb is turned on).

In the case of the sixth operating mode (Mode 6), in which the operating frequency fop is equal to or greater than the resonance frequency fr1, and moreover the state is the very light loading (VLL) state, backflow occurs in range D shown in FIG. 15. And, in the region of range E, in the interval in which the two main switching elements Qa, Qb are each turned on, backflow also occurs with the timing of the supply of power to the secondary side. This is because in the very light loading (VLL) state, little energy is sent to the secondary side, and so resonance operation ends in a short length of time. Hence when applying a signal (the same signal) synchronized with the gate signals Vga, Vgb to the synchronous rectification MOSFETs Qs1, Qs2 as the synchronous driving signals Vgs1, Vgs2, backflow occurs in each of the operating modes 1 to 3, 5 and 6, and so it has been necessary to shape signal waveforms for the synchronous driving signals Vgs1, Vgs2 in each of the corresponding regions (ranges A to E).

Hence in a conventional switching power supply device, a CWP (Constant Width Pulse) generation circuit is provided which outputs a constant-width pulse (CWP) signal with a pulse width slightly narrower than the turn-on intervals of the gate signals Vga, Vgb, to shape the waveforms of the synchronous driving signals Vgs1, Vgs2 for the synchronous rectification MOSFETs (see for example U.S. Pat. No. 7,184, 280). That is, when the operating frequency fop is the same as or higher than the resonance frequency fr1, the synchronous driving signals Vgs1, Vgs2 are synchronized with the gate signals Vga, Vgb, and when the operating frequency fop is lower than the resonance frequency fr1, the synchronous driving signals Vgs1, Vgs2 are made to end in synchronization with the constant-width pulse signal CWP. By this means, even when MOSFETs Qs1, Qs2 with low on-state resistances are substituted for the secondary-side rectifying diodes D1, D2, back currents from the secondary side can be prevented.

However, in the invention disclosed in U.S. Pat. No. 7,184, 280, the timing of the rising edge of the synchronous driving signals Vgs1, Vgs2 is always synchronized with the gate signals Vga, Vgb, so that it is difficult to prevent backflow immediately before the beginning of the secondary current, as in the backflow region (range B) in the second operation mode (Mode 2). Also, in Mode 4 to Mode 6, when the operating frequency fop is the same as or higher than the resonance frequency fr1, if the synchronous driving signals Vgs1, Vgs2 are synchronized with the gate signals Vga, Vgb, then backflow in the light loading (LL) state and in the very light loading (VLL) state can be prevented.

As another switching power supply device, a method is conceivable in which a control circuit of synchronous rectification MOSFETs is configured, as shown in FIG. 16A (see for example U.S. Patent Application No. 2008/0055942). Operation waveforms of the various portions are shown in FIG. 16B.

In this method, the drain-source voltage (Vds (on)) of a synchronous rectification switching element (MOSFET) is compared with a reference voltage REF by a comparator 510 to detect whether the synchronous rectification MOSFET, or its body diode, is conducting; when conduction is detected, and moreover during the interval in which the gate signal Vgp is H (high), a signal to turn on the synchronous rectification MOSFET is applied to the synchronous rectification MOSFET. That is, an AND (logical product) circuit 430 generates the AND signal of the comparison signal Vdsc which is the output of the comparator 510 and the gate signal Vgp of the primary-side main switching elements Qa, Qb, and outputs this signal, as the waveform-shaped synchronous driving signal Vgs (that is, Vgs1 and Vgs2), to the synchronous rectification MOSFETs Qs1, Qs2 which are the switching elements.

In general, the drain-source voltage Vds of a MOSFET is equal to the forward-direction voltage drop $V_F$ across the body diode in the state in which the MOSFET is turned off and current is flowing in the body diode. The forward-direction voltage drop $V_F$ across the body diode is precisely $-V_F$, taking the source potential as reference. On the other hand, when the MOSFET is in the on state, the voltage is the product of the on-state resistance and the flowing current, and the value (absolute value) is normally lower than $V_F$. The above-described reference voltage REF is set to be substantially lower than this absolute value, in order that current flowing in the body diode can initially be detected and MOSFET turn-on can be allowed, and then, after the MOSFET has been turned on, the MOSFET can be continually turned on even when the drain-source voltage Vds becomes low. In actuality, in consideration of noise and similar, the value must be made high enough that the fact that the MOSFET or the body diode thereof is conducting can be detected without error.

However, as shown in FIG. 16B, when the secondary current Is decreases and becomes zero, no matter how low the value of the reference voltage REF, the production of the MOSFET on-state resistance and the flowing current will at some time become smaller. Then, the comparison signal Vdsc is inverted, the MOSFET is turned off, and a state ensues in which current flows in the body diode, so that the drain-source voltage Vds becomes $-V_F$. By this mean the comparison signal Vdsc is again inverted, the MOSFET is again turned on, and as a result the comparison signal Vdsc is inverted yet again. Thereafter, as indicated by the error region in FIG. 16B, MOSFET on-off switching is repeated at high frequency until the secondary current Is completely reaches zero. This oscillation phenomenon is more marked when the load is light and the secondary current Is declines. In this way, in the invention described in U.S. Patent Application No. 2008/0055942, high-frequency oscillation is repeated each time the secondary current Is decreases to reach zero, and so this method poses problems from the standpoints of noise and power conversion efficiency.

U.S. Patent Application No. 2005/0122753 describes an invention in which the turn-on threshold value ($V_{TH2}$) is set taking into account the conduction voltage of the body diode (internal diode). Here, the turn-on timing of the synchronous driving signal is determined solely in terms of the conduction voltage of the internal diode, and so there is the problem that erroneous operation readily occurs due to the dead times set for the gate signals Vga, Vgb on the primary side. And, because the threshold value determining the turn-off timing ($V_{TH1}$) is an extremely small and negative value of approximately −20 mV, there are the problems that operation is easily affected by noise, and that the timing of the turn-off operation is unstable.

In another switching power supply device, the primary-side resonance current is detected by a current transformer, the excitation current is detected by secondary-side auxiliary windings, and the resonance current detection signal is compared with the excitation current detection signal. A synchronous rectification signal is generated based on a signal detecting whether the comparison result signal, the power switching signal, and the resonance current detection signal exceed 0 A (see for example Japanese Patent Application Laid-open No. 2005-198438).

By means of the technology of Japanese Patent Application Laid-open No. 2005-198438, the problem of backflow can be resolved for each of the discontinuous modes, but in operating modes with heavy load states (Modes 1 and 4), the synchronous rectification MOSFET turn-on timing lags, so that power efficiency is reduced. Moreover, a current transformer and auxiliary windings are used in the detection circuit, so that the circuit configuration is more complex, and designing the device with optimal adjusted values is difficult, so that this method is undesirable from the standpoint of cost as well.

Further, the invention disclosed in Japanese Patent Application Laid-open No. 2005-198375 relates to a synchronous rectification circuit which can prevent the flowing of current in the reverse direction, and a power converter with reduced power conversion losses. The source-drain voltage of a synchronous rectification transistor is compared by a comparator circuit, and when reverse-direction current is detected, current flow is prevented by switching means. Here, the timing with which the synchronous rectification transistor is turned off is determined, but there is no description of the turn-on timing. Hence this invention is not effective as a means of preventing backflow of current (ranges B and D) in the above-described second operating mode (Mode 2), third operating mode (Mode 3), fifth operating mode (Mode 5), and sixth operating mode (Mode 6).

Thus there have been no switching power supply devices of the prior art comprising driving circuits so as to reliably prevent backflow of secondary current to the primary side in all of the above-described six operating modes (see FIG. 9). In particular, a method of constantly detecting the loading state, and of causing a synchronous rectification MOSFET not to be turned on when in a very light loading state, has been effective for addressing current backflow (ranges C and E) in the third operating mode (Mode 3) and sixth operating mode (Mode 6). However, such methods of detecting a light loading state have the following problems.

One such method entails monitoring the output signal of an error amplifier 1, and detecting the state of the load connected to the switching power supply device. However, in this detection method, the load state is not detected on a pulse-by-pulse basis (here "pulse" means a switching pulse); that is, the load state is not detected each time switching is performed. And, because the error amplifier 1 itself has a response delay, a time delay necessarily occurs from the time a very light loading state is entered until a state detection signal indicating a very light load is output, so that switching operation of the synchronous rectification MOSFET cannot be stopped immediately, and a fundamental resolution of the problem of backflow is not obtained. Further, in ordinary current resonance converters, the VCO (voltage controlled oscillator) 2 is designed so as to reduce frequency fluctuations caused by load fluctuations. Hence fluctuations in error signals from the error amplifier 1 are also small, load fluctuations cannot easily be detected reliably, and moreover such detection is easily affected by noise.

As another method, it is also possible to use a resistance to monitor the current flowing in the load and detect a light loading state. However, power consumption occurs in the resistance provided on the secondary side, and so there is the problem that lowering of the power efficiency is unavoidable.

SUMMARY OF THE INVENTION

In view of the above, the invention provides a switching power supply device and a switching power supply control circuit which can reliably prevent backflow of current in any operating mode, can realize stabilized synchronous rectification functions, and which can detect a light loading state in pulse-by-pulse detection without worsening power efficiency, thereby overcoming the problems discussed above.

In order to resolve the above problems, the invention provides a switching power supply device, in which an input DC voltage is applied to a series resonance circuit, a prescribed output voltage is generated via a transformer, and power is supplied to a load.

In this switching power supply device, the series resonance circuit has a current resonance inductor and a current resonance capacitor. Moreover, a plurality of main switching elements or main switching element groups comprise, for example, MOSFETs, and are turned on and off in alternation to switch the current path of the series resonance circuit. In a transformer, a current is induced on the secondary side from the series resonance circuit by executing on/off control on the primary side of the main switching elements or of the main switching element groups. In a synchronous rectification switching element, in which a plurality of diode rectification elements or internal diodes are connected in parallel, on/off control is performed corresponding to the respective plurality of main switching elements or main switching element groups to rectify the secondary current of the transformer. A load judgment circuit takes the turn-on timing of a main switching element or main switching element group as a starting point to generate a reference time signal (Tsrs) having a prescribed time width. And, by comparing the delay time (Tdif) of the conduction timing of a diode rectifying element from the turn-on timing of the main switching element or main switching element group corresponding to the diode rectifying element, or the delay time (Tdif) of the conduction timing of an internal diode from the turn-on timing of the main switching element or the main switching element group corresponding to the synchronous rectification switching element to which the internal diode is connected in parallel, with a reference time signal generated by the load judgment circuit, the light loading state of the load is judged.

By means of this invention, a light loading state is expressed by the time difference between the conduction timing of a diode rectifying element or of the internal diode of a synchronous rectification switching element, and the turn-on timing of a main switching element, so that by comparing this time difference with a reference time signal, a light loading state can be detected by a logic circuit alone, and at the same time the light loading state can be detected without affecting power efficiency.

Further, when a plurality of synchronous rectification switching elements, with internal diodes connected in parallel, are provided on the secondary side of the transformer, the gate on/off signals applied to the gates of the main switching elements and a maximum on-width signal are utilized to enable control of the on intervals of synchronous rectification switching elements, so that all noise can be eliminated outside the times at which the main switching elements are turned on.

Further, a switching power supply device can be provided in which the conduction voltage of a diode connected in parallel to a synchronous rectification switching element is detected from the cross-terminal voltage level of the synchronous rectification switching element, and by using this only in control of the turn-on timing of the synchronous rectification switching element, and moreover effectively applying the maximum on-width signal, synchronous rectification functions of a current resonance converter are realized, with robustness with respect to noise in cross-terminal voltage level detection, with no erroneous operation, and with no occurrence of backflow.

In particular, by preventing current backflow in light loading states, and by detecting the drain-source voltages of synchronous rectification MOSFETs with stability, simple synchronous rectification with erroneous operation prevented can be realized.

Other features, advantages, modifications, embodiments, etc., of the invention will become apparent to those skilled in the art from the following detailed description of the preferred embodiments.

BRIEF DESCRIPTION OF THE DRAWINGS

The invention will be described with reference to certain preferred embodiments and the accompanying drawings, wherein:

FIG. 9 shows the relation between the operating frequency fs and the resonance frequency fr, as well as the load state, for six operating modes;

FIG. 14 shows the secondary-side current waveforms induced via the transformer when in the fifth operating mode;

FIG. 15 shows the secondary-side current waveforms induced via the transformer when in the sixth operating mode; and FIG. 16 is used to explain problems with the prior art, in which

DESCRIPTION OF THE PREFERRED EMBODIMENTS

Figure 1:
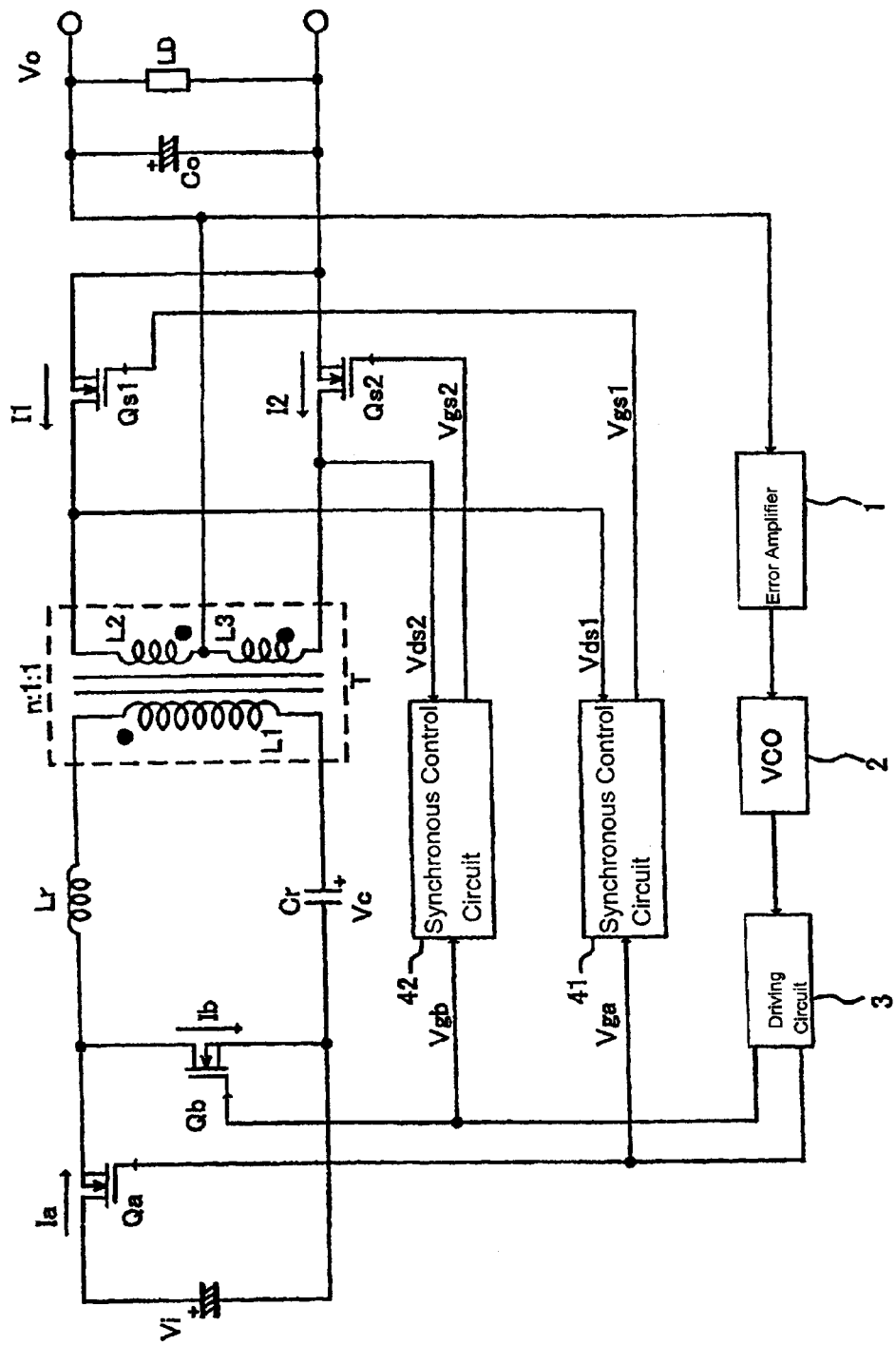
FIG. 1 is a circuit diagram showing the overall configuration of the switching power supply device of an aspect.

FIG. 1 is a circuit diagram showing the overall configuration of the switching power supply device of an aspect. The switching power supply device is configured such that an input DC voltage Vi is applied to a series resonance circuit having a resonance inductor Lr and a resonance capacitor Cr, and a prescribed output voltage $V_O$ for a load LD is generated via a transformer T. MOSFETs Qa, Qb are main switching elements which switch the current path to the series resonance circuit by switching in alternation on the primary side of the transformer T. One end of the resonance inductor Lr is connected to one end of the primary windings L1 of the transformer T, and the other end of the primary windings L1 is connected to one end of the resonance capacitor Cr. A configuration may be employed in which no inductance other than that of the transformer T is provided, and the linkage inductance of the transformer T is employed as a current resonance inductor. Also, a configuration may be employed in which an external inductance is provided separately from the transformer T, and the current resonance inductor Lr is formed by this external inductance and the linkage inductance.

Figure 2:
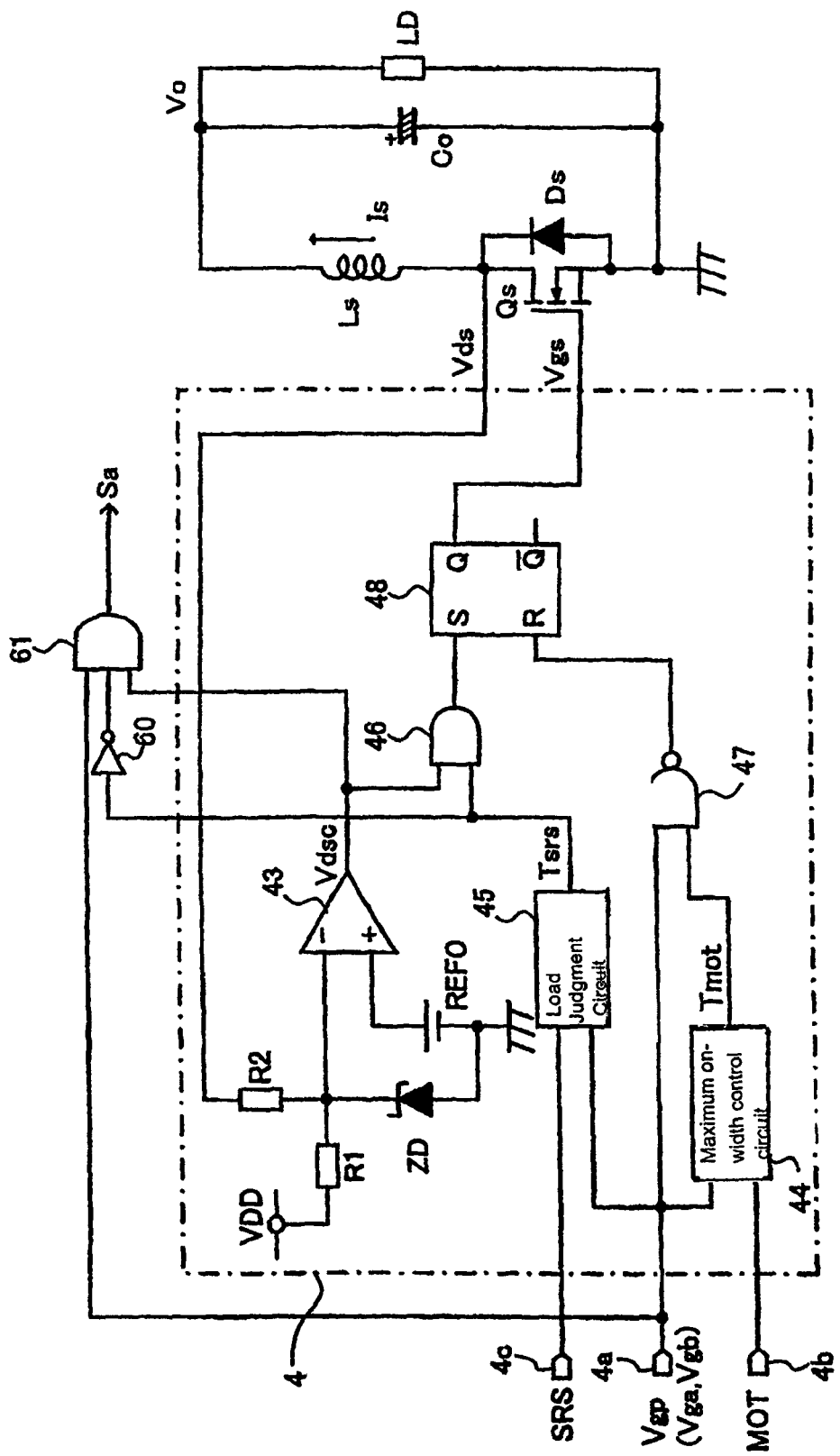
FIG. 2 is a circuit diagram showing a synchronous control circuit of a switching power supply device.

Secondary windings L2 and tertiary windings L3 are connected in series on the secondary side of the transformer T; the connection point is connected to one end of the output capacitor $C_O$ and the load LD. The other end of the secondary windings L2 and tertiary windings L3 are connected, via synchronous rectification MOSFETs Qs1 and Qs2 respectively, to the other ends on the ground side of the output capacitor $C_O$ and the load LD. The MOSFETs Qs1, Qs2 are synchronous rectification switching elements which turn on and off the secondary currents I1, I2 induced by the transformer T corresponding to operation of the MOSFETs Qa, Qb, to supply a prescribed output voltage $V_O$ to the load LD. Internal diodes (body diodes, or body diodes and external diodes) Ds are connected in parallel to each of the MOSFETs Qs1 and Qs2, as shown in FIG. 2 described below.

The output voltage $V_O$ supplied to the load LD is fed back to the driving circuit 3 of the MOSFETs Qa, Qb via the error amplifier 1 and a VCO (voltage controlled oscillator circuit) 2. Here, gate signals Vga, Vgb which are turned on and off in alternation with prescribed timing are generated in the driving circuit 3, and the currents Ia, Ib of the MOSFETs Qa, Qb are controlled so as to flow in the directions of the arrows with prescribed timing. The current Ib flows in the direction opposite the arrow depending on operating conditions. Here, the output frequency of the VCO 2 is changed to be higher when it is judged from the output of the error amplifier 1 that the output voltage $V_O$ is higher than a preset voltage, or that the load LD is a light load. Conversely, when it is judged that the output voltage $V_O$ is lower than the preset voltage, or that the load LD is a heavy load, the VCO 2 functions to lower the output frequency.

Synchronous control circuits 41 and 42, to which the gate signals Vga and Vgb generated by the driving circuit 3 are respectively input, are provided in the switching power supply device. These synchronous control circuits 41, 42 further take as inputs the cross-terminal voltage signals Vds1, Vds1 across the sources and drains of the synchronous rectification MOSFETs Qs1, Qs2. And, synchronous driving signals Vgs1, Vgs2 which control the on periods of the synchronous rectification MOSFETs Qs1, Qs2 are output from these synchronous control circuits 41, 42 respectively. As explained below, these synchronous driving signals Vgs1, Vgs2 turn on the MOSFETs Qs1, Qs2 respectively synchronized to the slower timing among the on timing of the MOSFETs Qa, Qb, or the conduction timing of the internal diodes Ds (see FIG. 2) detected from the cross-terminal voltage signals Vds1, Vds2 of the MOSFETs Qs1, Qs2. Hence in this switching power supply device, the voltage and the current flowing in the primary windings L1 of the transformer are appropriately controlled by the synchronous rectification MOSFETs Qs1, Qs2, and not only is the output voltage $V_O$ to the secondary-side load LD controlled at a constant voltage, but as explained below, backflow of secondary-side current can be reliably prevented in all operating modes.

Next, the specific configuration of the synchronous control circuits 41, 42 is explained. FIG. 2 is a circuit diagram showing a synchronous control circuit of a switching power supply device. Here, the configurations of the synchronous control circuits 41 and 42 in FIG. 1 are equivalent, and so a synchronous control circuit 4 is shown representing both. The synchronous rectification MOSFET Qs is a switching element controlling the secondary current Is in the secondary windings L2 or tertiary windings L3 (in FIG. 2, denoted by Ls) on the secondary side of the transformer T, and has an internal diode Ds connected in parallel across the drain and source.

The synchronous control circuit 4 comprises two resistors R1 and R2; a Zener diode ZD; a comparator 43; a maximum on-width control circuit 44; a load judgment circuit 45; and logic circuits such as an AND circuit 46, NAND (negative logical product) circuit 47, flip-flop circuit 48, and similar, and generates a synchronous driving signal Vgs for the synchronous rectification MOSFET Qs. Here, the inverting input terminal (−) of the comparator 43 is connected to ground via the Zener diode ZD, and is connected to the power supply voltage VDD via the resistor R1, and is also connected to the drain terminal of the synchronous rectification MOSFET Qs via the resistor R2. The reference voltage REF0 is applied to the non-inverting input terminal (+) of the comparator 43.

The maximum on-width control circuit 44 and load judgment circuit 45 have nearly equivalent configurations, as explained below. These circuits 44 and 45 are connected to the gate signal input terminal 4a to which one among the gate signals Vga, Vgb (hereafter simply called the gate signal Vgp) for the MOSFET Qa or Qb corresponding to the synchronous rectification MOSFET Qs shown in FIG. 2. Of these, the maximum on-width control circuit 44 comprises a MOT terminal 4b, and by connecting a resistor, capacitor, or other external component to this MOT terminal 4b, the magnitude of the maximum on width of the synchronous driving signal Vgs is adjusted according to the resonance frequency fr1. Also, the load judgment circuit 45 is a circuit which generates a reference time pulse Tsrs, which serves as reference for a very light loading state under which the synchronous rectification MOSFET Qs is not turned on, and comprises an SRS terminal 4c, to which is connected an external component (resistor, capacitor, or similar) to set this pulse width.

One output terminal of the maximum on-width control circuit 44 is connected to the reset terminal (R) of the flip-flop circuit 48 via the NAND circuit 47, connected to the gate signal input terminal 4a. The output terminals of the comparator 43 and load judgment circuit 45 are connected to the set terminal (S) of the flip-flop circuit 48 via the AND circuit 46. And, the output signal of the flip-flop circuit 48 is output to the synchronous rectification MOSFET Qs as the gate signal Vgs.

Let the power supply voltage VDD be A, and let the drain-source voltage Vds of the MOSFET Qs when the level detection signal Vdsc output from the comparator 43 is inverted (hereafter this is called the threshold value voltage Vds_th) be X. When the drain-source voltage Vds is equal to X, the two inputs to the comparator 43 are equal, and so the following equation obtains. The above threshold value voltage Vds_th is separate from the threshold value relating to on/off control of the MOSFET Qs.

$$(A-X)*(R2/(R1+R2))+X=REF0$$

$$\therefore (A-X)+X*(1+R1/R2)=REF0*(1+R1/R2)$$

$$\therefore X*(R1/R2)=(1+R1/R2)*REF0-A$$

Hence, the threshold value voltage Vds_th of the drain-source voltage Vds of the MOSFET Qs when the level detection signal Vdsc is inverted is given by equation (3).

$$Vds\_th = -VDD\frac{R2}{R1} + REF0\left(1+\frac{R2}{R1}\right) \quad (3)$$

When the drain-source voltage Vds exceeds the threshold value voltage Vds_th (strictly speaking, both are negative values, and when the absolute value of Vds becomes larger than the absolute value of the threshold value voltage Vds_th), the level detection signal Vdsc which is the output of the comparator 43 is changed from L to H. In the state in which no current is flowing between the drain and source of the MOSFET Qs or in the internal diode Ds, the value of the drain-source voltage Vds is positive, and the level detection signal Vdsc is L. In the state in which the MOSFET Qs is turned off but current is flowing in the internal diode Ds, the forward-direction voltage drop $V_F$ across the internal diode Ds is applied as the drain-source voltage Vds of the MOSFET Qs, and the threshold value voltage Vds_th is set to be lower than this forward-direction voltage drop $V_F$, so that the level detection signal Vdsc is H. This level detection signal Vdsc for the drain-source voltage Vds is supplied as the set signal of the flip-flop circuit 48, and the output signal from the NAND circuit 47, to which the gate signal Vgp and the maximum on-width signal Tmot are input, becomes the reset signal for the flip-flop circuit 48.

The flip-flop circuit 48 is a reset-priority circuit. That is, even when the drain-source voltage Vds exceeds the threshold value voltage Vds_th, if the gate signal Vgp is in the L (low) state indicating the start of the maximum on-width, the flip-flop circuit 48 cannot be set. By this means, erroneous operation which may occur due to dead time set in the primary-side gate signals Vga, Vgb can be prevented.

In the load judgment circuit 45, for each timing of the turning-on of the MOSFETs Qa and Qb reference time pulses Tsrs are generated as judgment reference pulses for the delay time Tdif of the conduction timing of the internal diodes Ds determined according to the magnitude of the load LD, with the turn-on timing of the MOSFETs Qa and Qb as starting points, and having a prescribed time width. The delay time Tdif is longer for lighter loading by the load LD, and so the delay time Tdif is compared with this reference time pulse Tsrs to decide whether or not to turn on the synchronous rectification MOSFET Qs. That is, under very light loading in which the delay time Tdif is longer than a prescribed time width stipulated by the reference time pulse Tsrs, the output of the AND circuit 46 does not go to H, so that the flip-flop circuit 48 is not set, and the synchronous rectification MOSFET Qs is not turned on.

As light load detection means, an inverter 60 and AND circuit 61 can be added to the synchronous control circuit 4, so that very light loading such that the delay time Tdif is longer than the prescribed time width stipulated by the reference time pulse Tsrs can be detected, and an alarm signal Sa can be issued. Here, the reference time pulse Tsrs is input to the inverter 60, and the gate signal Vgp, level detection signal Vdsc, and output signal of the inverter 60 are input to the AND circuit 61. The output signal of this AND circuit 60 becomes the alarm signal Sa. By means of this configuration, during the period in which the gate signal Vgp is at H, if at the time the level detection signal Vdsc changes from L to H the reference time pulse Tsrs has already changed from H to L, then the alarm signal Sa goes to H. That is, when the delay time Tdif is longer than the prescribed time width stipulated by the reference time pulse Tsrs, the alarm signal Sa goes to H.

In the maximum on-width control circuit 44, a maximum on-width signal Tmot is generated which indicates the start of the maximum on-width for the synchronous rectification MOSFET Qs synchronized with the turn-on timing of the MOSFETs Qa and Qb, and which indicates the end of the maximum on-width after a prescribed time longer than the time width of the reference time pulse Tsrs in the load judgment circuit 45. That is, this maximum on-width signal Tmot is a signal which is synchronized with the turn-on timing of the MOSFET Qa or Qb, stipulates the on signal for the synchronous rectification MOSFET Qs, and, when outside this period, indicates the end of the maximum on-width period H (in other periods L) to forcibly turn off the MOSFET Qs. The start of the maximum on-width is the same as the timing with which the gate signals Vga, Vgb for the MOSFETs Qa and Qb go to H and the MOSFETs Qa, Qb are turned on.

In the synchronous control circuit 4, the timing with which the MOSFET Qs is turned on is decided so as to be synchronized with the later timing among the timing indicating the start of the maximum on-width (that is, the timing with which the maximum on-width signal Tmot goes from L to H, and reset of the flip-flop circuit 48 is released), and the conduction timing of the internal diode Ds detected by the MOSFET Qs source-drain voltage Vds; and the timing with which the MOSFET Qs is turned off is decided so as to be synchronized with the earlier timing among the turn-off timing of the MOSFETs Qa and Qb, and the timing indicating the end of the maximum on-width.

In the NAND circuit 47, the (negation of the) logical product of the gate signal Vgp and the maximum on-width signal Tmot is taken, and so the flip-flop circuit 48 is reset with the timing of the earlier among the timing with which the maximum on-width signal Tmot goes to L, and the timing with which the on period of the gate signal Vgp ends and the signal goes to L.

With respect to the maximum on-width control circuit 44 and the load judgment circuit 45, by means of an external component connected to the MOT terminal 4b or to the SRS terminal 4c, a one-shot multivibrator which adjusts the pulse width of the maximum on-width signal Tmot and reference time pulse Tsrs which are respectively output can be configured. However, a one-shot multivibrator is itself widely known, and so further explanation is omitted.

Here, the specific configuration of a load judgment circuit 45 and maximum on-width control circuit 44 operating corresponding to a one-shot multivibrator, and operation by the synchronous control circuit 4 to control the secondary current Is, are explained. The load judgment circuit 45 and maximum on-width control circuit 44 are circuits which do not output the reference time pulse Tsrs itself or the maximum on-width signal Tmot itself, but which generate the reference time end signal Tsrs2 and maximum on-width end signal Tmot2 indicating the timing of the end of these signals. That is, the values of the reference time end signal Tsrs2 and of the maximum on-width end signal Tmot2 do not change even when the gate signal Vgp goes to H and triggers are applied to the load judgment circuit 45 and the maximum on-width control circuit 44; they are signals with values which first change when the reference time pulse Tsrs and maximum on-width signal Tmot end, and which operate corresponding to the output signal of the one-shot multivibrator described above.

Figure 3:
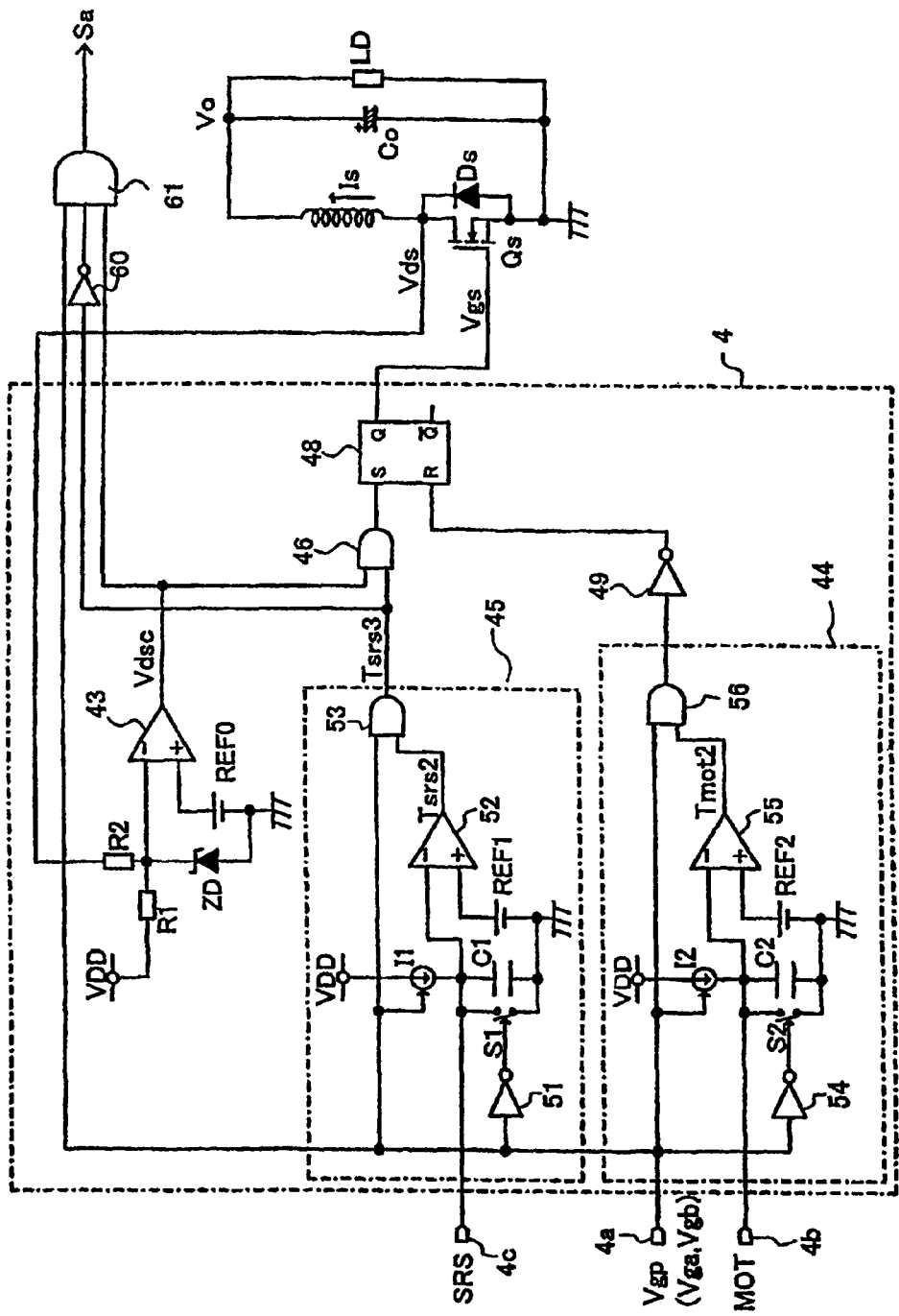
FIG. 3 is a circuit diagram showing in detail an example of the configuration of a synchronous control circuit comprising a load judgment circuit.

FIG. 3 is a circuit diagram showing in detail an example of the configuration of the synchronous control circuit 4, comprising the load judgment circuit 45. The load judgment circuit 45 comprises an inverter 51, connected to the gate signal input terminal 4a; a constant current supply I1, connected to the power supply voltage VDD; a capacitor C1, one end of which is connected to the constant current supply I1 and the other end of which is grounded; a switch S1, which is turned on and off by the inverter 51 so as to control charging and discharging of the capacitor C1; a comparator 52, which compares the charging voltage of the capacitor C1 to a reference voltage REF1 and outputs a reference time end signal Tsrs2; and an AND circuit 53. The AND circuit 53 has one input terminal connected to the gate signal input terminal 4a, and the other input terminal connected to the output terminal of the comparator 52.

In the load judgment circuit 45, when the switch S1 is turned off by the gate signal Vgp at the gate signal input terminal 4a, current from the constant current supply I1 begins to charge the capacitor C1. And, with the timing with which the voltage at the inverted terminal (−) of the comparator 52 exceeds the reference voltage REF1 at the non-inverting input terminal (+), the reference time end signal Tsrs2, which is the output of the comparator 52, changes from H to L. The AND circuit 53 outputs a signal Tsrs3, which is the logical product of the reference time end signal Tsrs2 and the gate signal Vgp, to the AND circuit 46. This signal Tsrs3 is equivalent to the logical product of the reference time pulse Tsrs and the gate signal Vgp when a one-shot multivibrator is applied to the load judgment circuit 45. Hence the waveform is the same as the signal which ends earlier (goes to L) among the reference time pulse Tsrs and the gate signal Vgp. Normally the reference time pulse Tsrs ends earlier, and so the waveform is the same as the reference time pulse Tsrs. And, the signal (reference time pulse) Tsrs3 output from the load judgment circuit 45 is supplied, via the AND circuit 46, to the set terminal S of the flip-flop circuit 48.

In this way, the delay time Tdif appearing in the timing of conduction of the internal diode Ds fluctuates according to the magnitude of the load LD of the switching power supply device, and so if the load state is a very light loading state, the flip-flop 48 is held in the reset state, and the synchronous control MOSFETs Qs are not turned on. When in the driving circuit 3 the gate signal Vgp goes to L and the switch S1 is turned on, charge on the capacitor C1 is discharged, and at this time the reference time end signal Tsrs2, which is the output of the comparator 52, goes to H. Thereafter the reference time end signal Tsrs2 does not immediately go to L even after the gate signal Vgp goes to H, and after time equal to the pulse width of the reference time pulse Tsrs has elapsed, the reference time end signal Tsrs2 goes to L. That is, the reference time end signal Tsrs2 is a signal which does not indicate the start of the reference time, but indicates only the end, and the change in value of the signal from H to L indicates the end of the reference time.

When connecting an external resistor to the SRS terminal 4c, the current from the constant current supply I1 is divided by the resistor. Hence the pulse width of the reference time pulse Tsrs can be broadened according to the resistance value of the external resistor. Also, when a capacitor is connected, the effect is equivalent to an increase in the capacitance value of the capacitor C1, and so by this means also the pulse width of the reference time pulse Tsrs can be broadened.

Similarly to the explanation above relating to FIG. 2, by adding an inverter 60 and AND circuit 61 to the synchronous control circuit 4, the very light loading state in which the delay time Tdif is longer than the prescribed time width stipulated by the reference time pulse Tsrs can be detected, and an alarm signal Sa can be issued. In FIG. 3, the signal Tsrs3 is input to the inverter 60 in place of the reference time pulse Tsrs, but as explained above, the signal Tsrs3 and the reference time pulse Tsrs have the same waveform. Otherwise the configuration is the same as in FIG. 2. By means of this configuration, during the period in which the gate signal Vgp is at H, if at the time the level detection signal Vdsc changes from L to H the reference time pulse Tsrs3 has already changed from H to L, then the alarm signal Sa goes to H. That is, when the delay time Tdif is detected as being longer than the prescribed time width stipulated by the reference time pulse Tsrs, the alarm signal Sa goes to H.

The maximum on-width control circuit 44 comprises an inverter 54, connected to the gate signal input terminal 4a; constant current supply I2, connected to the power supply voltage VDD; a capacitor C2, one end of which is connected to the constant current supply I2 and the other end of which is grounded; a switch S2, which is turned on and off by the inverter 54 so as to control charging and discharging of the capacitor C2; a comparator 55, which compares the charging voltage of the capacitor C2 to a reference voltage REF2 and outputs a maximum on-width end signal Tmot2; and an AND circuit 56. The AND circuit 56 has one input terminal connected to the gate signal input terminal 4a, and the other input terminal connected to the output terminal of the comparator 55. Here, in order that the configuration coincides with that of the load judgment circuit 45, a configuration is employed in which the NAND circuit 47 in FIG. 2 is replaced with an inverter circuit 49, but there is no practical difference between the two.

In the maximum on-width control circuit 44, when the switch S2 is turned off by the gate signal Vgp of the gate signal input terminal 4a, current from the constant current supply I2 begins to charge the capacitor C2. Then, with the timing at which the voltage at the inverting input terminal (−) of the comparator 55 exceeds the reference voltage REF2 applied to the non-inverting input terminal (+), the maximum on-width end signal Tmot2, which is the output of the comparator 55, changes from H to L, and is output to the inverter circuit 49 via the AND circuit 56. That is, when the maximum on-width end signal Tmot2 changes to L and L is output from the AND circuit 56, the output of the inverter circuit 49 goes to H, and the flip-flop circuit 48 is reset.

The fact that the maximum on-width end signal Tmot2 is at H from before the gate signal Vgp goes to H is different from the maximum on-width signal Tmot of FIG. 2; but by using the AND circuit 56 to take the logical product of the maximum on-width end signal Tmot2 and the gate signal Vgp, the output of the inverter circuit 49 is made equal to the output of the NAND circuit 47 of FIG. 2, that is, equal to the negated logical product signal of the maximum on-width signal Tmot and the gate signal Vgp.

Through the above, the start of the maximum on-width signal Tmot is the timing with which the gate signal Vgp goes to H. By inputting the gate signal Vgp to the reset terminal (R) of the flip-flop circuit 48 via the AND circuit 56 and the inverter circuit 49, in the circuit of FIG. 3 as well, changing of the gate signal Vgp to H and resetting of the flip-flop circuit 48 by the start of the maximum on-width signal Tmot is ensured. And, by this means the timing of the start of the maximum on-width from the maximum on-width control circuit 44 can be indicated as the end of the reset signal for the flip-flop circuit 48. Hence by indicating the start and end of the maximum on-width of the synchronous driving signal Vgs from the maximum on-width control circuit 44, a maximum on-width signal Tmot having an appropriate on-width is set.

Figure 4:
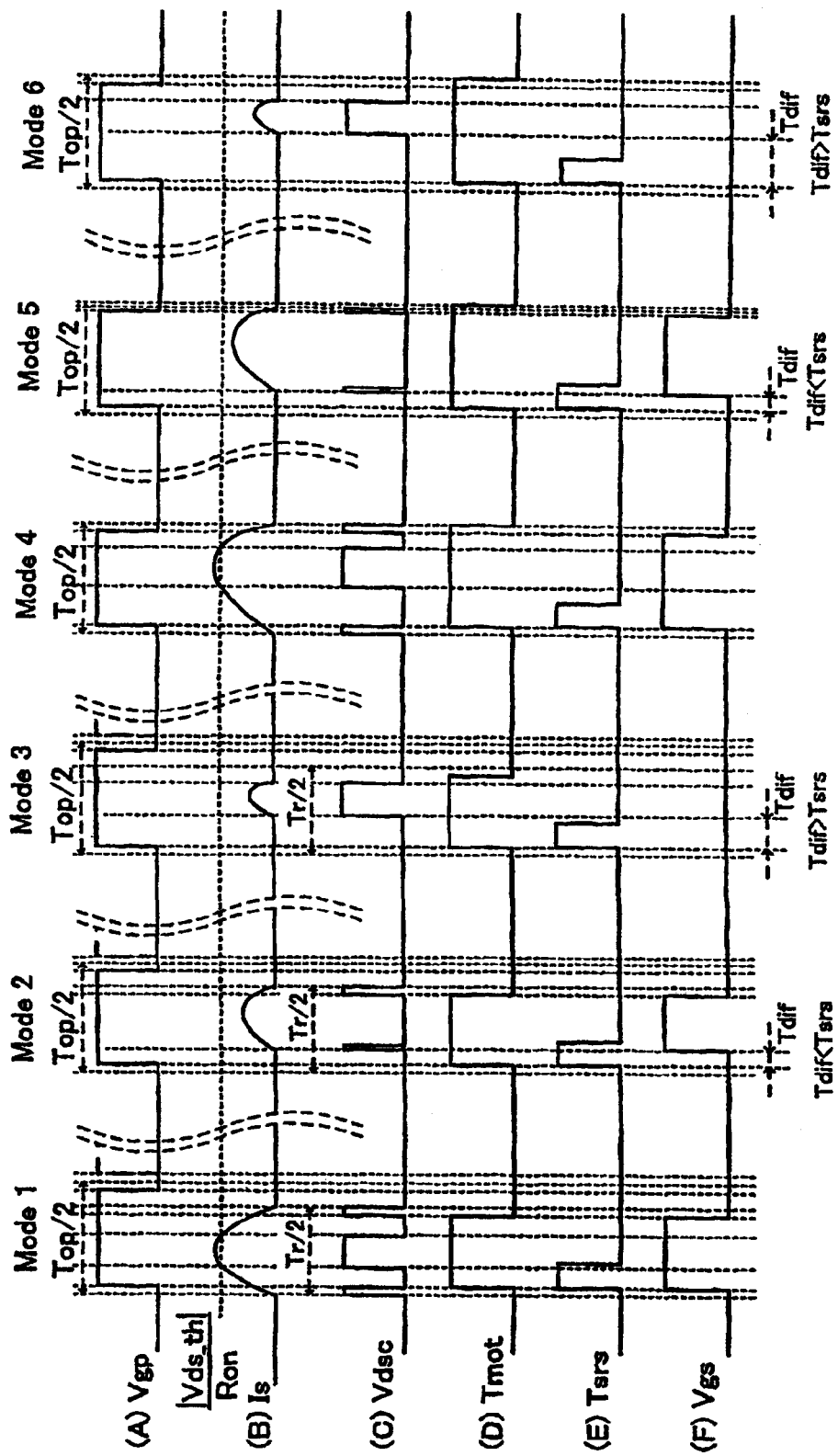
FIG. 4 is a timing diagram explaining operation to control the secondary-side current by the synchronous control circuit of FIG. 2.

FIG. 4 is a timing diagram explaining operation to control the secondary-side current by the synchronous control circuit of FIG. 2. That is, the figure is a timing diagram for a case in which the maximum on-width control circuit 44 and the load judgment circuit 45 comprise one-shot multivibrators.

In FIG. 4A, the gate signal Vgp from the driving circuit 3 shown in FIG. 1 is shown along the same time axis for the six operating modes Mode 1 to Mode 6. In FIG. 4B, the secondary current Is flowing in a synchronous rectification MOSFET Qs is compared with the absolute value of the MOSFET Qs drain-source voltage (|Vds_th|) when the level detection signal Vdsc is inverted, converted into a current by dividing by the MOSFET Qs on-state resistance Ron. The threshold value voltage Vds_th can be calculated using equation (3) described above. Or, the voltage Vds_th can be decided in advance, and other parameters can be adjusted using equation (3).

FIG. 4C shows the waveform of the level detection signal Vdsc. |Vds_th|/Ron shown in FIG. 4B indicates the level of the secondary current Is at which the level detection signal Vdsc output from the comparator 43 goes to H. And, FIG. 4D shows the maximum on-width signal Tmot, FIG. 4E shows the reference time pulse Tsrs, and FIG. 4F shows the synchronous driving signal Vgs output from the synchronous control circuit 4. The delay time Tdif of the conduction timing for the internal diode Ds occurring with respect to the turn-on timing of the MOSFETs Qa, Qb is shown for operating Modes 2, 3, 5 and 6. At this time, if the delay time Tdif exceeds the pulse width of the reference time pulse Tsrs set by the load judgment circuit 45, the synchronous driving signal Vgs from the synchronous control circuit 4 does not appear.

As is clear from the explanation immediately following equation (3), the level detection signal Vdsc in FIG. 4C is, in Modes 1, 2, 4 and 5, a pulse-shape signal occurring with the initial and final timing of the vibration waveform of the secondary current Is shown in FIG. 4B, and the square waveforms in Modes 3 and 6 occur due to the state in which the MOSFET Qs is turned off, and current is flowing in the internal diode Ds.

Figure 12:
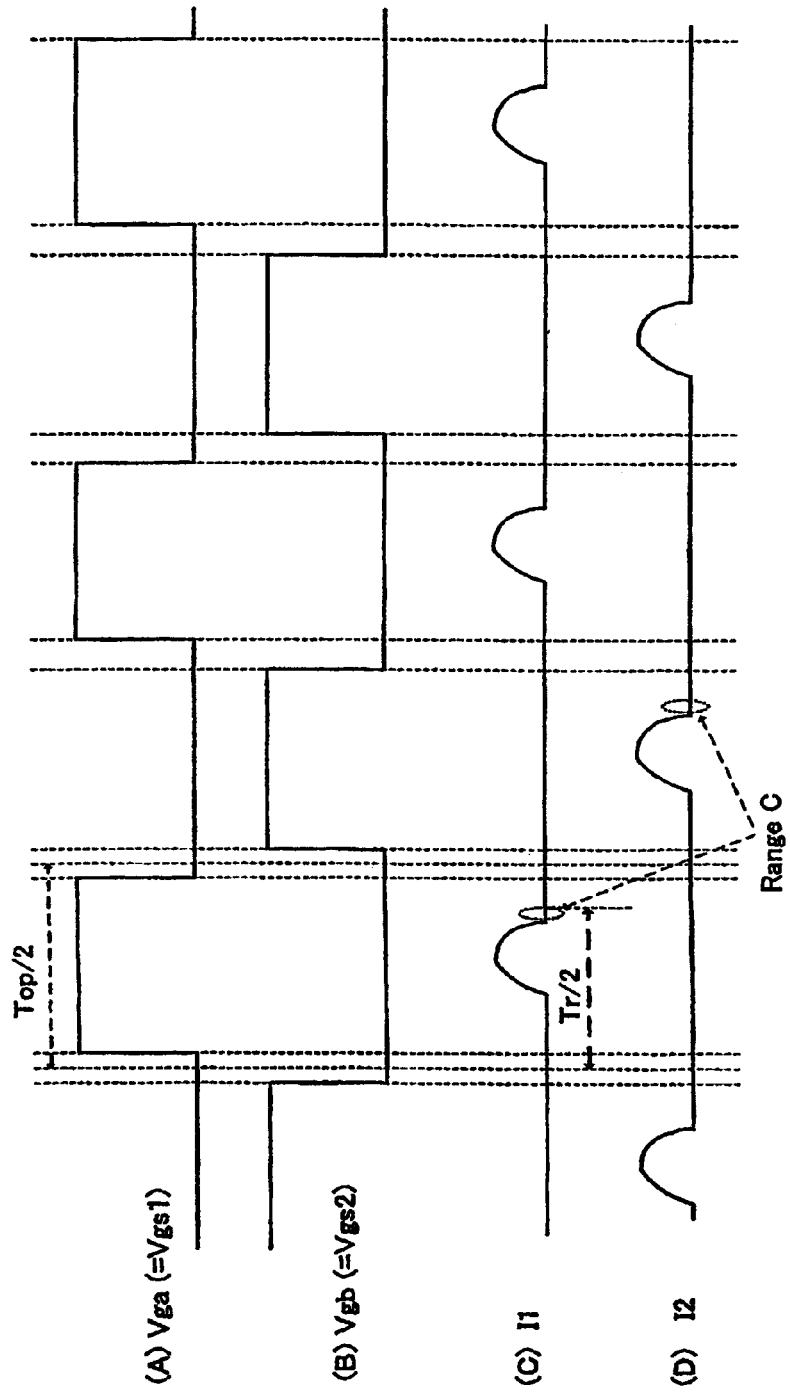
FIG. 12 shows the secondary-side current waveforms induced via the transformer when in the third operating mode.
Figure 13:
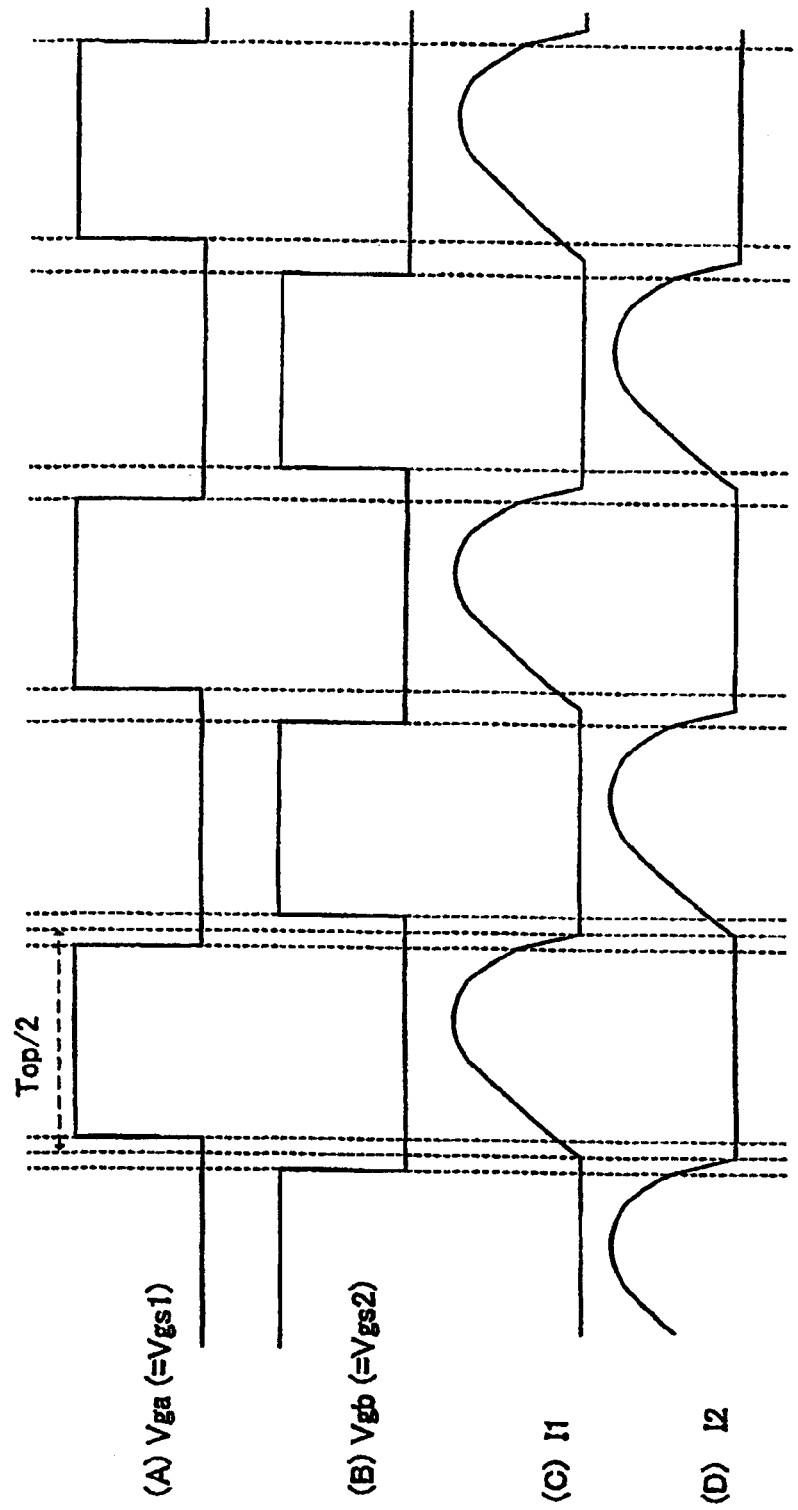
FIG. 13 shows the secondary-side current waveforms induced via the transformer when in the fourth operating mode.
Figure 16B:
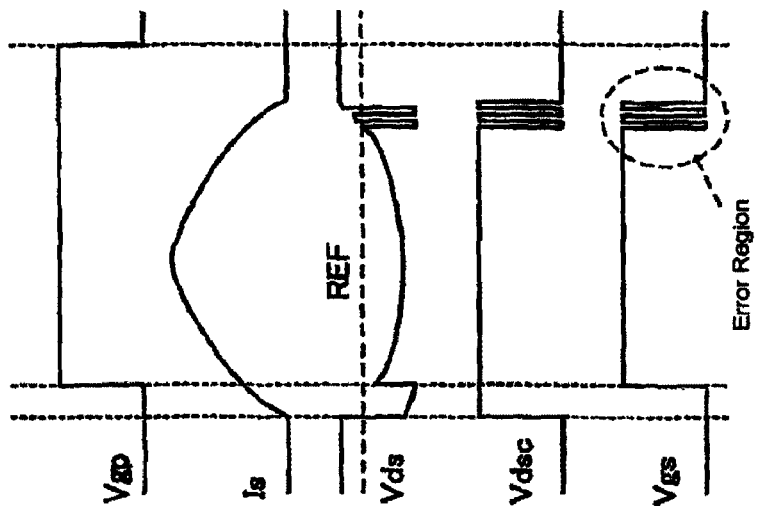
FIG. 16B is an operating waveform diagram for different portions of a control circuit.
Figure 16A:
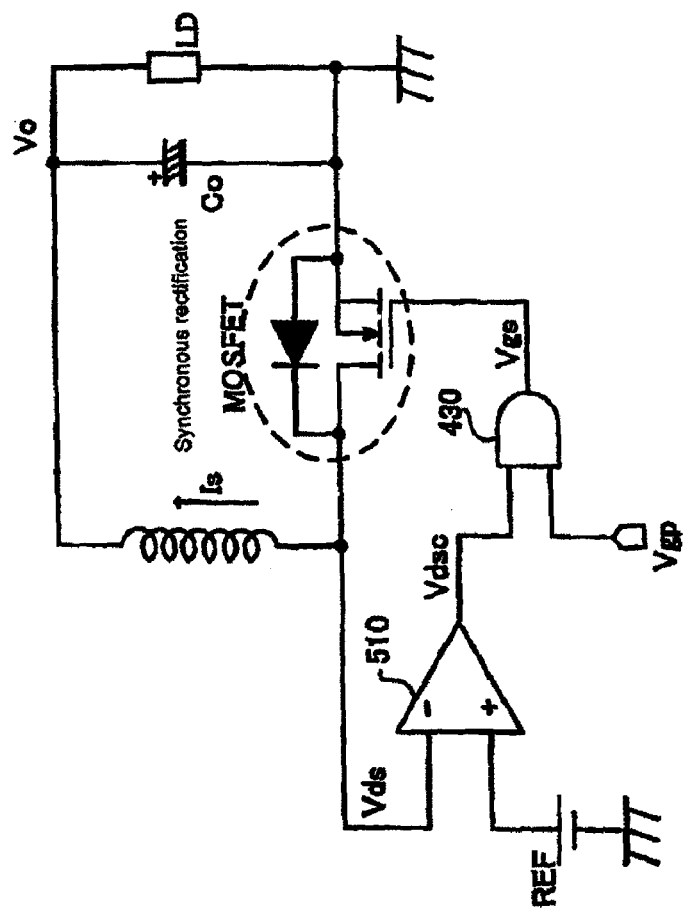
FIG. 16A shows a MOSFET control circuit for synchronous rectification.

That is in the third and sixth operating modes (Modes 3 and 6), in which this delay time Tdif exceeds the pulse width of the reference time pulse Tsrs of the load judgment circuit 45, a very light loading state of the load LD is detected, and a synchronous driving signal Vgs is not output from the synchronous control circuit 4. Hence in the very light loading state the MOSFETs Qs are not turned on, and backflow which had occurred in the conventional range C (FIG. 12) or range E (FIG. 15) can be reliably prevented.

Figure 10:
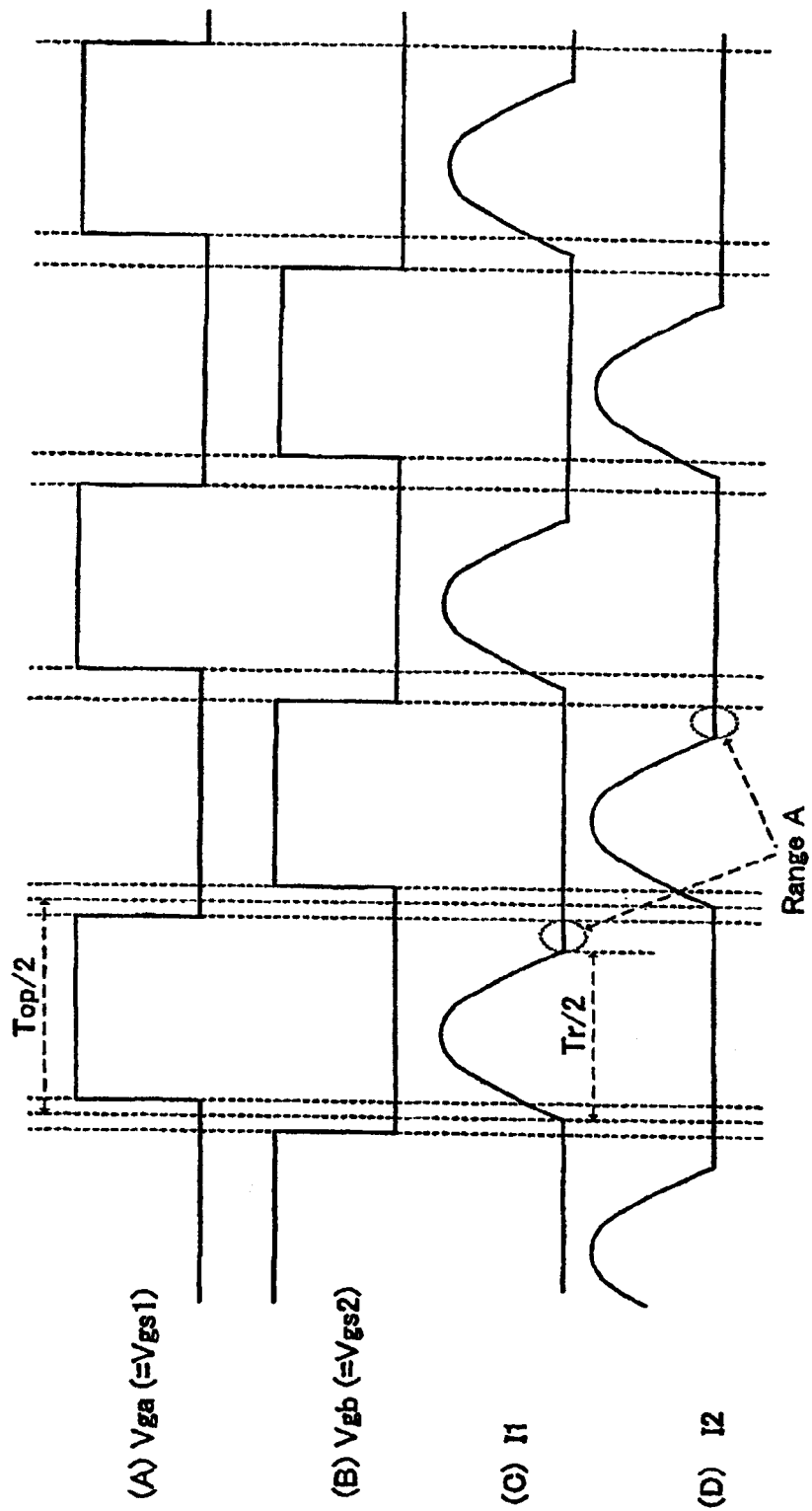
FIG. 10 shows the secondary-side current waveforms induced via the transformer when in the first operating mode.

Further, in the first operating mode (Mode 1), the synchronous driving signal Vgs turns off the MOSFET Qs in synchronization with the earlier timing among the turn-off timing of the gate signal Vgp and the timing with which the maximum on-width signal Tmot indicates the off state. Hence backflow in range A (FIG. 10), which in the prior art had occurred with the timing of the second half of the switching operation half-period (Top/2), can be reliably prevented.

Figure 11:
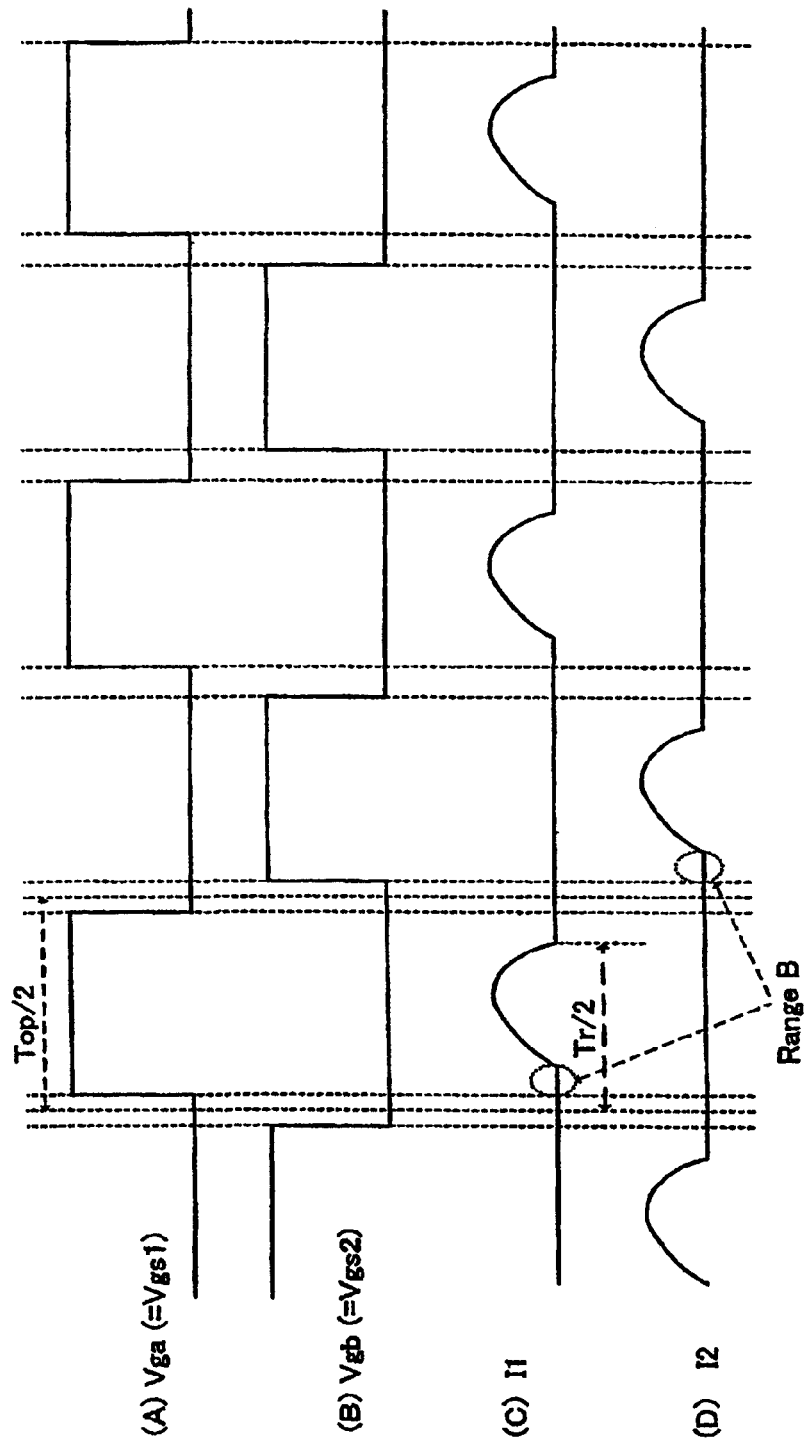
FIG. 11 shows the secondary-side current waveforms induced via the transformer when in the second operating mode.

Further, in the second and fifth operating modes (Modes 2 and 5), the synchronous driving signal Vgs turns on the MOSFET Qs in synchronization with the later timing among the timing with which the maximum on-width signal Tmot indicates the on state and the timing of conduction of the internal diode Ds detected by the level detection signal Vdsc of the drain-source voltage Vds, and so the backflow in range B (FIG. 11) or in range D (FIG. 14), which in the prior art had occurred with the timing of the first half of the switching operation half-period (Top/2), can be reliably prevented. Also, once a MOSFET Qs is turned on, fluctuations in the drain-source voltage Vds are ignored. Hence the phenomenon in which there is repeated high-frequency oscillation each time the secondary current Is decreases to reach zero, such as is seen in the configuration of U.S. Patent Application No. 2008/0055942, does not occur.

The very light loading state was defined as being a state in which the load LD actually connected is less than 20% of the rated load (maximum load) of the switching power supply device; however, this fraction setting can be modified as convenient. In this case, by using an external resistor to adjust the output pulse width of the reference time pulse Tsrs or the output timing of the reference time end signal Tsrs2, the very light loading range in which the synchronous driving signal Vgs is not turned on may be modified and set.

As explained above, when the load LD of the switching power supply device is in a light loading state, the conduction timing of the internal diodes Ds in the synchronous rectification MOSFETs Qs1, Qs2 is later than the timing with which the MOSFETs Qa, Qb, which are the main switching elements, are turned on, so that by detecting the lengthening of the delay time Tdif as the load LD becomes lighter, the light loading state can be ascertained on a pulse-by-pulse basis. Further, a synchronous driving signal Vgs can be supplied to a synchronous rectification MOSFET Qs with the timing shown in FIG. 4, so that no backflow occurs in any of the first to sixth operating modes, and stable synchronous rectification functions can be realized.

In the above-described aspect, a half-bridge type switching power supply device was explained; but this invention can also be applied to a full-bridge type switching power supply device or to the control circuit of such a switching power supply device, as well as to a method of control of a full-bridge type switching power supply device.

Figure 5:
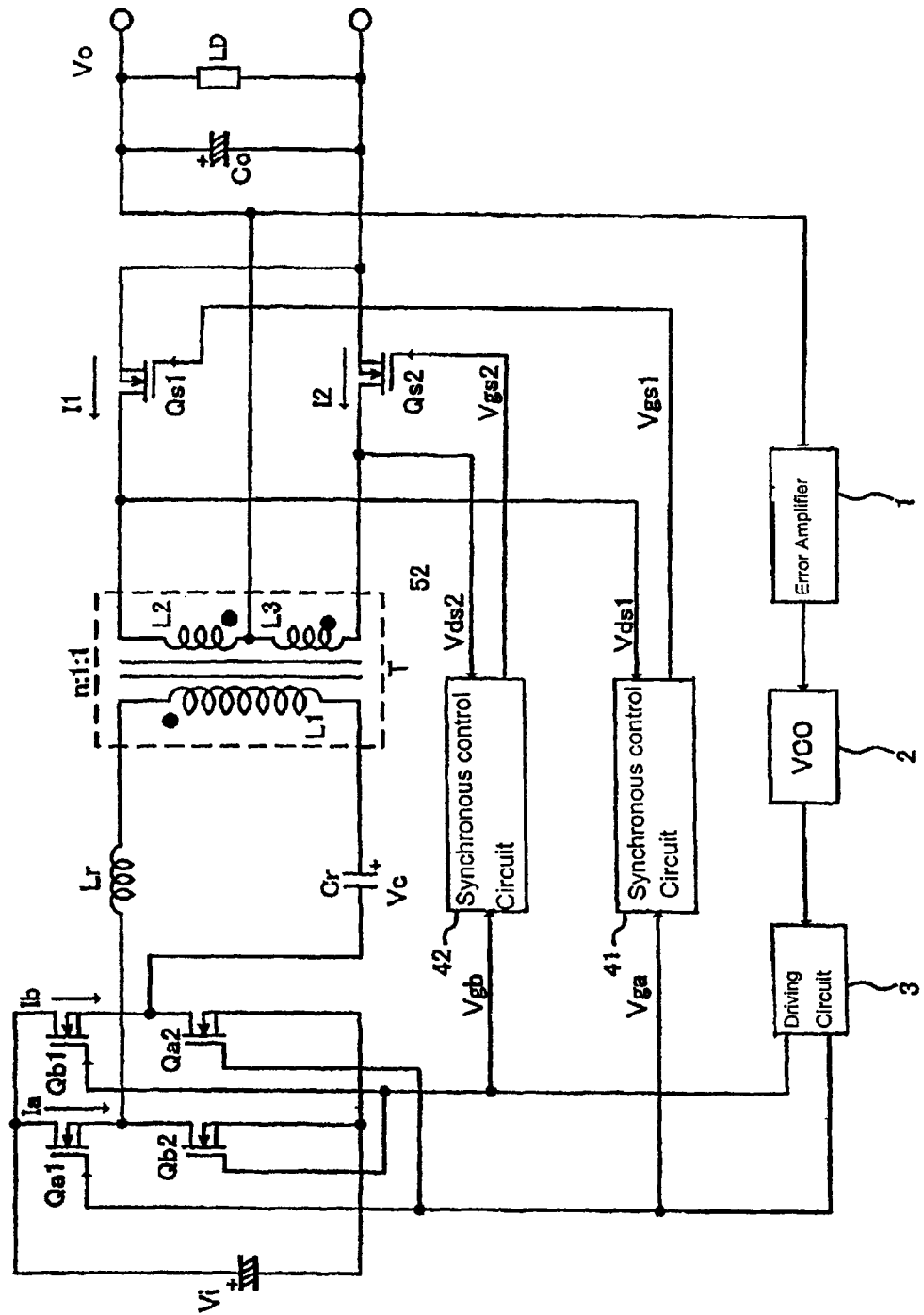
FIG. 5 is a circuit diagram showing the overall configuration of a full-bridge type switching power supply device.

FIG. 5 is a circuit diagram showing the overall configuration of a full-bridge type switching power supply device. In the full-bridge type switching power supply device shown in FIG. 5, the driving circuit 3 generates gate signals Vga, Vgb which turn on and off in alternation with prescribed timing, and the MOSFETs Qa1, Qa2 of a first main switching element group and the MOSFETs Qb1, Qb2 of a second main switching element group are switched in alternation by gate signals Vga, Vgb on the primary side of the transformer T. The current Ia flows in the direction of the arrow with the timing with which the MOSFETs Qa1, Qa2 of the first main switching element group are turned on, the current Ib flows in the direction of the arrow with the timing with which the MOSFETs Qb1, Qb2 of the second main switching element group are turned on, and an input DC voltage Vi is applied to a series resonance circuit having a resonance inductor Lr and a resonance capacitor Cr.

On the secondary side of the transformer T, MOSFETs Qs1 and QS2, as synchronous rectification switching elements, turn on and off the secondary currents I1, I2 induced from the transformer T corresponding to operation of the first main switching element group of MOSFETs Qa1, Qa2 or the second main switching element group of MOSFETs Qb1, Qb2, to supply a prescribed output voltage $V_O$ to the load LD.

The synchronous control circuits 41, 42 of the switching power supply device of FIG. 5 have the same configuration as the synchronous control circuits 41, 42 shown in FIG. 1, and the above explanation relating to FIG. 1 to FIG. 4 can be applied without modification. That is, upon detecting that the delay time Tdif is longer than a prescribed time width stipulated by a reference time pulse Tsrs, the synchronous control circuits 41, 42 can output an alarm signal Sa, and/or can execute control so that the synchronous control MOSFETs Qs1, Qs2 are not turned on, or can perform other operations.

In the synchronous control circuits 41, 42, in order to indicate the prescribed time maximum on-width for synchronous rectification MOSFETs Qs1 and Qs2, in synchronization with the turn-on timing of the MOSFETs Qa1, Qa2, Qb1, Qb2 of the first main switching element group or second main switching element group, outside of which the MOSFETs Qs1, Qs2 are forcibly turned off, a maximum on-width signal Tmot which is H in the period of the maximum on width (and is L (low) for other periods), or a maximum on-width end signal Tmot2 which is a signal indicating the end of the maximum on-width, is generated and output. Here also, the start of the maximum on-width is indicated by the gate signals Vga, Vgb of the MOSFETs Qa1, Qa2, Qb1, Qb2, and has the same timing with which the gate signals Vga, Vgb go to H and the MOSFETs Qa1, Qa2, Qb1, Qb2 are turned on. And, in the synchronous control circuits 41, 42 which actually generate the synchronous driving signals Vgs1, Vgs2 of the synchronous rectification MOSFETs Qs1, Qs2, the timing with which the MOSFETs Qs1, Qs2 are turned on is decided so as to be synchronized with the later timing among the timing of indication of the start of the maximum on-width (that is, the timing with which the maximum on-width signal Tmot goes from L to H), and the conduction timing of the internal diodes Ds detected from the drain-source voltages Vds1, Vds2 of the MOSFETs Qs1, Qs2, while the timing with which the MOSFETs Qs1, Qs2 are turned off is decided so as to be synchronized with the earlier timing among the turn-off timing of the MOSFETs Qa1, Qa2, Qb1, Qb2, and the timing of indication of the end of the maximum on-width.

Figure 6:
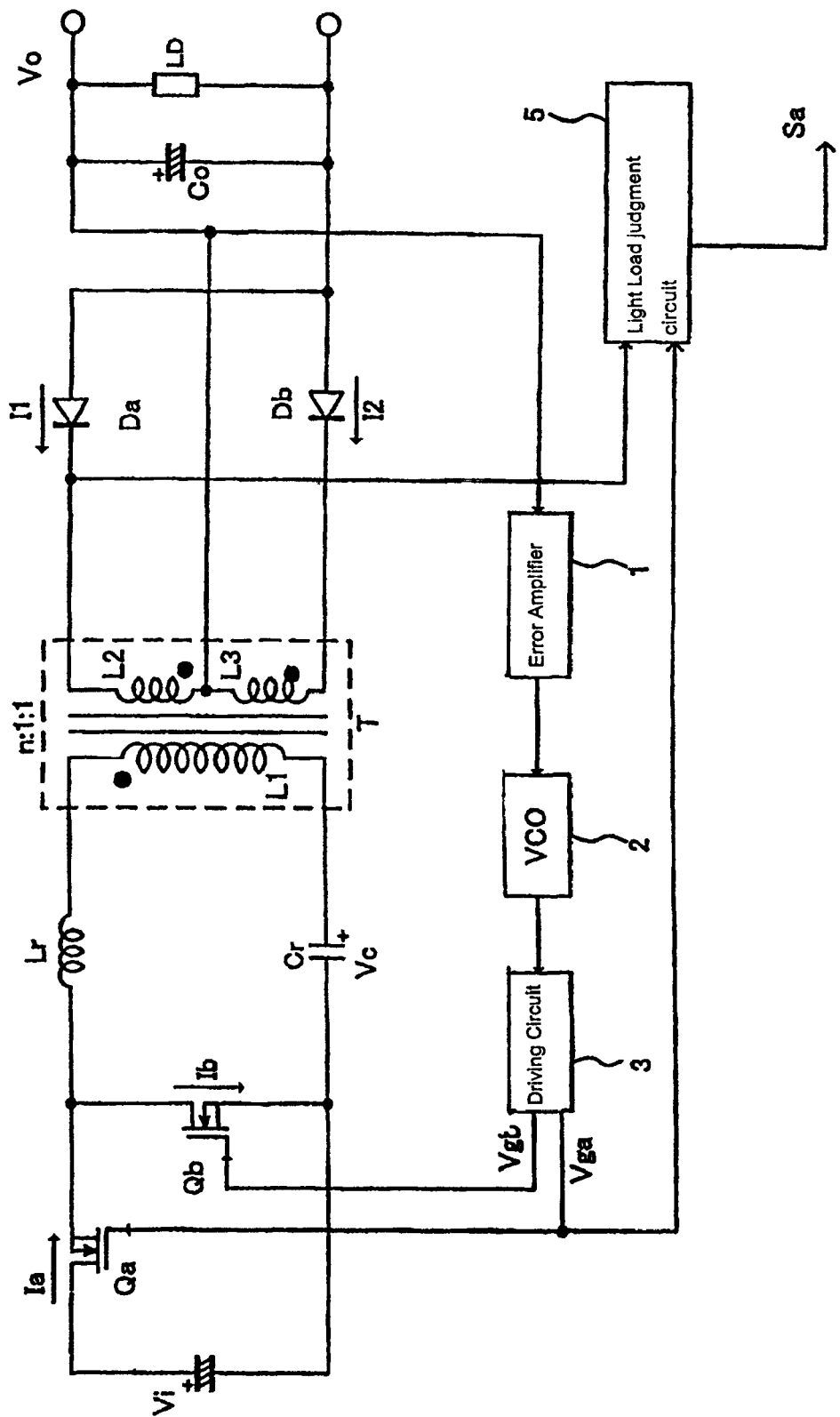
FIG. 6 is a circuit diagram showing the overall configuration of the switching power supply device of another aspect.
Figure 7:
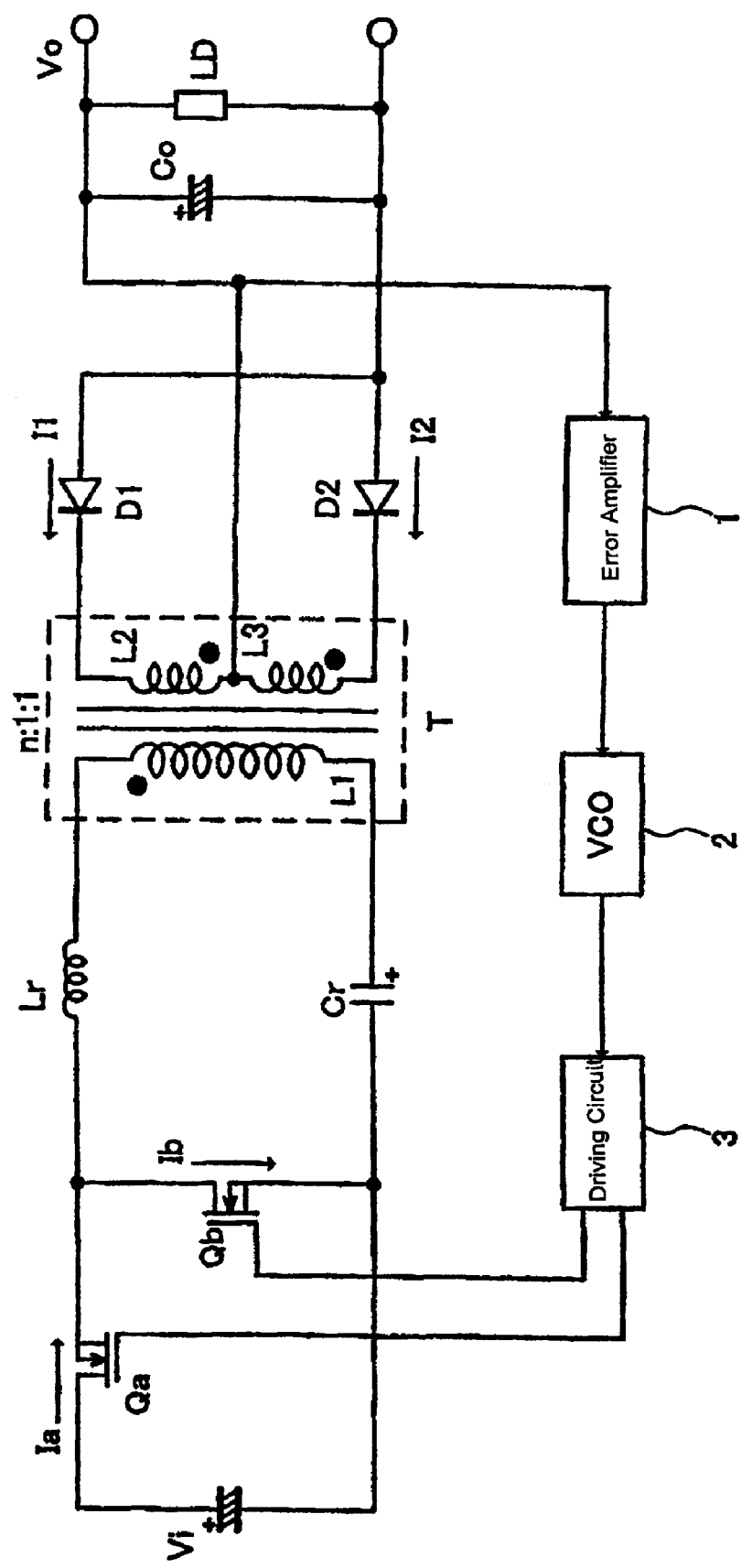
FIG. 7 is a circuit diagram showing an example of a conventional current resonance converter.
Figure 8:
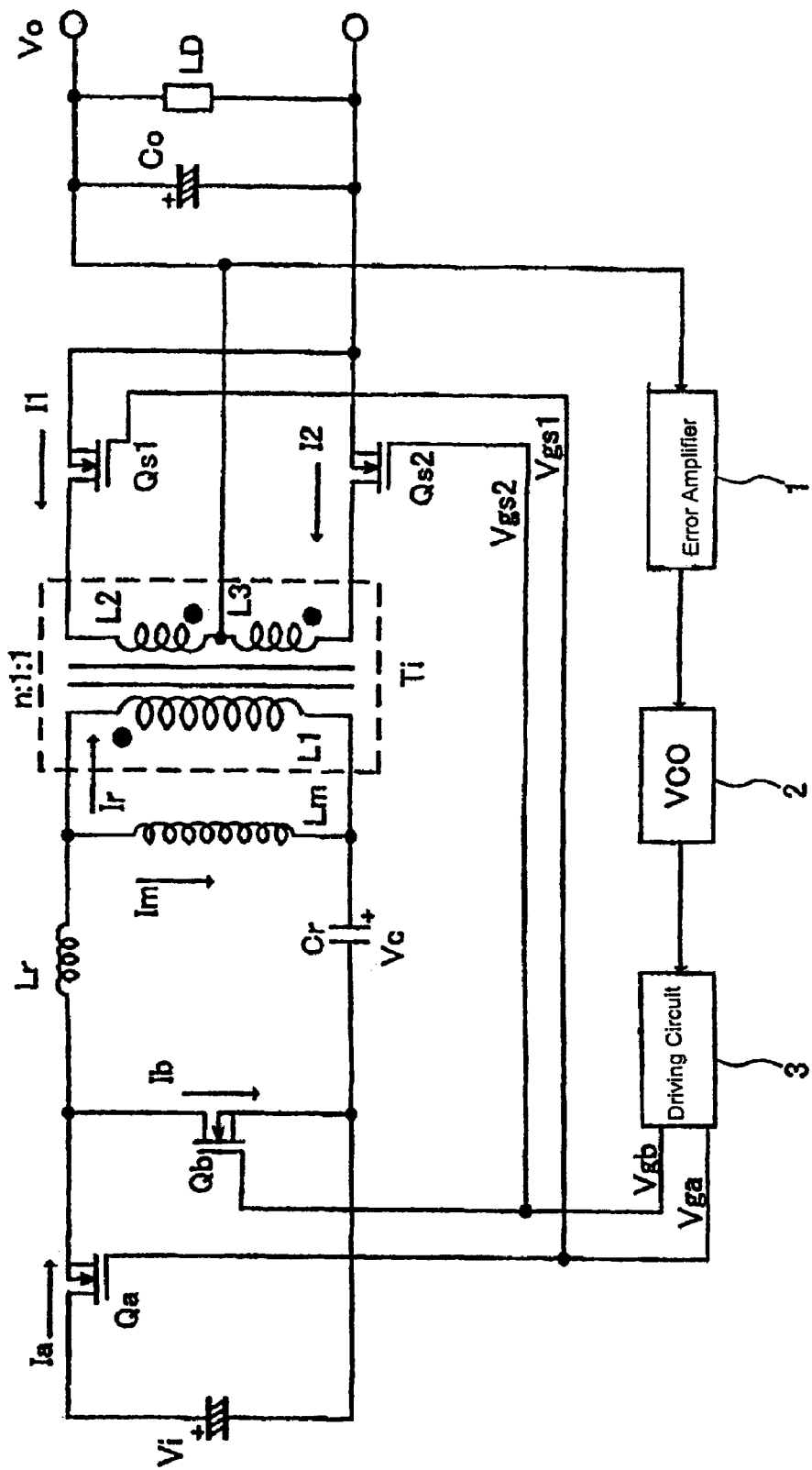
FIG. 8 shows a current resonance converter, in which the rectifying diodes of FIG. 7 are replaced with MOSFETs.

The switching power supply control circuit has the same configuration as in the half-bridge type switching power supply device, and an explanation is omitted. FIG. 6 is a circuit diagram showing the overall configuration of the switching power supply device of another aspect.

The switching power supply device of FIG. 6 comprises a current resonance converter using a diode rectifying element. In this current resonance converter, an input DC voltage Vi is applied to a series resonance circuit having a resonance inductor Lr and a resonance capacitor Cr. The driving circuit 3 turns on and off the two main switching elements Qa and Qb, comprising MOSFETs or similar, and by controlling the path of the primary-side current flowing in the primary windings L1 of the power conversion transformer T, passes a sinusoidal-shape current in the primary windings L1 of the transformer T. In place of the synchronous rectification switching elements (MOSFETs Qs1, Qs2) in FIG. 1, rectifying diodes Da, Db which rectify the secondary currents I1, I2 induced in the secondary windings L2 and tertiary windings L3 of the transformer T are connected to the respective windings. An output capacitor $C_O$ which smoothes the output voltage $V_O$ is connected in parallel with the load LD. And, the output voltage $V_O$ to the load LD is fed back to the driving circuit 3 via an error amplifier 1 and VCO 2, and the voltage of and current flowing in the primary windings L1 of the transformer T are controlled by the main switching elements Qa, Qb, to control the output voltage $V_O$ at a constant voltage.

The light load judgment circuit 5 generates an alarm signal Sa when the delay time of the conduction timing of the rectifying diodes Da, Db exceeds the time width of a reference time signal. This light load judgment circuit 5 comprises the circuit portion which generates the level detection signal Vdsc, the load judgment circuit 45, and the inverter 60 and AND circuit 61 among the synchronous control circuit 4 shown in FIG. 3; the gate signal Vga generated by the driving circuit 3 and the anode-cathode terminal voltage signal of the rectifying diode Da are input thereto. The cross-terminal voltage signal of the rectifying diode Da takes the place of the drain-source voltage Vds of the synchronous rectification switching element (MOSFET) in FIG. 3. And, by detecting the time difference between the conduction timing due to the current I1 in the rectifying diode Da and the timing of turning on the main switching element Qa, the state of the load LD can be detected. In FIG. 6, a light loading judgment circuit 5, which detects light loading from the gate signal Vga and the cross-terminal voltage signal of the rectifying diode Da, is shown; a light loading judgment circuit which detects light loading from the gate signal Vgb and the cross-terminal voltage signal of the rectifying gate diode Db can be similarly configured.

Here, no further explanation is given of the detailed configuration of a light load judgment circuit 5, but in any case, a reference time signal having a prescribed time width, generated by the load judgment circuit, serves as reference for judging the delay time of the conduction timing of the rectifying diodes Da and Db determined according to the magnitude of the load LD each time the main switching elements Qa, Qb are turned on.

The alarm signal Sa output externally from the light load judgment circuit 5 is for example used to eliminate power losses in the backflow region in which charge accumulated on the capacitor $C_O$ is discharged, to prevent a decline in power conversion efficiency during light loading. If upon detection of light loading the control method of the switching power supply device is changed from PWM (Pulse Width Modulation) control to PFM (Pulse Frequency Modulation) control with a constant frequency, losses due to the excitation current of the transformer during light loading can be reduced.

The invention has been described with reference to certain preferred embodiments thereof. It will be understood, however, that modifications and variations are possible within the scope of the appended claims.

This application claims priority from Japanese Application No. 2008-274171 filed Oct. 24, 2008 and Japanese Application No. 2009-153140 filed Jun. 29, 2009, the contents of each of which are incorporated herein by reference.

What is claimed is:

1. A switching power supply device, in which an input DC voltage is applied to a series resonance circuit, and a prescribed output voltage is generated via a transformer and power is supplied to a load, comprising:

a series resonance circuit, having a current resonance inductor and a current resonance capacitor;

a plurality of main switching elements or main switching element groups, which are turned on and off in alternation to switch a current path of the series resonance circuit;

a transformer, which causes a secondary-side current to be induced from the series resonance circuit by primary-side on/off control of the main switching elements or main switching element groups;

a plurality of diode rectifying elements, which are turned on and off corresponding to the plurality of main switching elements or main switching element groups, to rectify the secondary current of the transformer; and a load judgment circuit, which generates a reference time signal having a prescribed time width, with a turn-on timing of the main switching elements or main switching element groups as a starting point;

wherein a light loading state of the load is judged by comparing a delay time of a conduction timing of the diode rectifying elements from the turn-on timing of the main switching elements or main switching element groups corresponding to the diode rectifying elements with the reference time signal generated by the load judgment circuit; and the switching power supply device further comprising:

a light load judgment circuit, which generates an alarm signal when the delay time of the conduction timing of the diode rectifying elements exceeds the time width of the reference time signal generated by the load judgment circuit.

2. The switching power supply device according to claim 1, wherein:

a plurality of synchronous rectification switching elements, with internal diodes connected in parallel, are provided in place of the diode rectifying elements on the secondary side of the transformer;

a synchronous control circuit is provided, which controls an on period of the synchronous rectification switching elements such that the synchronous rectification switching element are turned on in synchronization with the later timing among the turn-on timing of the main switching elements or main switching element groups corresponding to the synchronous rectification switching elements, and the conduction timing of the internal diodes detected from a cross-terminal voltage signal of the synchronous rectification switching elements; and a light loading state of the load is judged by comparing a delay time of the conduction timing of the internal diodes from the turn-on timing of the main switching elements or main switching element groups corresponding to the synchronous rectification switching elements with the internal diodes connected in parallel, with the reference time signal generated by the load judgment circuit.

3. The switching power supply device according to claim 2, wherein, when the delay time of the conduction timing of the internal diodes exceeds the time width of the reference time signal generated by the load judgment circuit, the synchronous rectification switching elements are not turned on.

4. The switching power supply device according to claim 2, further comprising a maximum on-width control circuit which indicates the start of a maximum on-width for the synchronous rectification switching elements in synchronization with the turn-on timing of the main switching elements or main switching element groups, and which indicates the end of the maximum on-width after a prescribed time longer than the reference time signal, wherein, in the synchronous control circuit, the synchronous rectification switching elements are turned off in synchronization with the earlier timing among a turn-off timing of the main switching elements or main switching element groups, and a timing with which the end of the maximum on-width is indicated by the maximum on-width control circuit.

5. The switching power supply device according to claim 1, wherein the prescribed time width of the reference time signal can be modified and set in the load judgment circuit.

6. The switching power supply device according to claim 2, wherein the prescribed time width of the reference time signal can be modified and set in the load judgment circuit.

7. The switching power supply device according to claim 1, wherein, in the series resonance circuit, the current resonance inductor, or a portion thereof, is formed by a leakage inductance of the transformer.

8. The switching power supply device according to claim 2, wherein, in the series resonance circuit, the current resonance inductor, or a portion thereof, is formed by a leakage inductance of the transformer.

9. The switching power supply device according to claim 1, wherein the main switching elements or main switching element groups form a half-bridge type or a full-bridge type converter which causes switching operation of the series resonance circuit to generate an AC current.

10. The switching power supply device according to claim 2, wherein the main switching elements or main switching element groups form a half-bridge type or a full-bridge type converter which causes switching operation of the series resonance circuit to generate an AC current.

11. The switching power supply device according to claim 2, wherein MOSFETs (Metal-Oxide Semiconductor Field-Effect Transistors) are used as the synchronous rectification switching elements.

12. The switching power supply device according to claim 8, wherein the internal diodes are parasitic diodes of the MOSFETs.

13. A control circuit, of a switching power supply device including a series resonance circuit having a current resonance inductor and a current resonance capacitor, a plurality of main switching elements or main switching element groups which are turned on and off in alternation to switch a current path of the series resonance circuit, a transformer which causes a secondary-side current to be induced from the series resonance circuit by primary-side on/off control of the main switching elements or main switching element groups, and a plurality of diode rectifying elements or synchronous rectification switching elements which are turned on and off corresponding to the plurality of main switching elements or main switching element groups to rectify the secondary current of the transformer, comprising:

a load judgment circuit, which generates a reference time signal having a prescribed time width, with a turn-on timing of the main switching elements or main switching element groups as a starting point;

a synchronous control circuit, which judges a light load state of the load by comparing a delay time of a conduction timing of the diode rectifying elements from the turn-on timing of the main switching elements or main switching element groups corresponding to the diode rectifying elements, or a delay time of the conduction timing of the internal diodes from the turn-on timing of the main switching elements or main switching element groups corresponding to the synchronous rectification switching elements with the internal diodes connected in parallel, with the reference time signal generated by the load judgment circuit; and a light load judgment circuit, which generates an alarm signal when the delay time of the conduction timing of the diode rectifying elements exceeds the time width of the reference time signal generated by the load judgment circuit.

* * * * *